United States Patent
Liu et al.

(10) Patent No.: US 12,282,648 B2
(45) Date of Patent: Apr. 22, 2025

(54) CUSTOMIZABLE AND ANIMATABLE POPUP CARD SYSTEM

(71) Applicant: Microsoft Technology Licensing, LLC, Redmond, WA (US)

(72) Inventors: Xin Liu, Seattle, WA (US); Chaochao Huang, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/332,654

(22) Filed: Jun. 9, 2023

(65) Prior Publication Data
US 2024/0411425 A1 Dec. 12, 2024

(51) Int. Cl.
*G06F 3/0482* (2013.01)
*G06F 3/0485* (2022.01)
*G06T 13/80* (2011.01)

(52) U.S. Cl.
CPC .......... *G06F 3/0482* (2013.01); *G06F 3/0485* (2013.01); *G06T 13/80* (2013.01)

(58) Field of Classification Search
CPC ...... G06F 3/0484; G06F 3/0481; G06F 16/23; G06F 3/0488; G06F 9/455; G06F 11/14; G06F 3/0483; G06F 11/34; G06F 9/44; G06F 1/00; G06F 11/00; G06F 11/36; G06F 12/14; G06F 16/11; G06F 16/17; G06F 16/22; G06F 16/27; G06F 16/9035; G06F 16/9038; G06F 16/909; G06F 17/16; G06F 21/00; G06F 21/56; G06F 21/57; G06F 21/62; G06F 3/0482; G06F 3/0486; G06F 30/20; G06F 40/143; G06F 7/00; G06F 8/38; G06F 9/445; G06F 9/448; G06F 9/451; G06F 9/46; G06F 16/25; G06F 16/832; G06F 16/835; G06F 16/838; G06F 16/84; G06F 16/958; G06F 3/00; G06F 3/048; G06F 3/04845; G06F 3/14; G06F 7/04; G06F 9/00; G06F 16/583; G06F 16/538; G06T 7/11; G06T 7/194; G06T 11/00; G06T 19/00; G06N 20/00; G06N 20/10
See application file for complete search history.

(56) References Cited

U.S. PATENT DOCUMENTS

| | | | |
|---|---|---|---|
| 8,423,904 B2 * | 4/2013 | Kim | G06F 3/04886 715/808 |
| 2010/0313165 A1 * | 12/2010 | Louch | G06F 9/451 715/792 |

(Continued)

*Primary Examiner* — Rayeez R Chowdhury

(57) ABSTRACT

Systems and methods are provided for implementing a customizable and animatable popup card system. The popup card system includes animatable popup cards and popup card user interface ("UI") elements, with location awareness functionality and scrolling awareness functionality. A user experience ("UX") that is generated and displayed by the popup card system is adaptive to a multitude of scenarios and app (e.g., window) surfaces and is responsive to a variety of user inputs (including via mouse, keyboard, pen/stylus, touch, and voice). Transitioning between popup card states and/or between corresponding popup cards is smooth and seamless, and is anchored within the UI or app window, without need for users to navigate to another page or app to complete an action triggered by user input.

20 Claims, 21 Drawing Sheets

(56) References Cited

U.S. PATENT DOCUMENTS

| | | | | |
|---|---|---|---|---|
| 2014/0237421 A1* | 8/2014 | Kuhne | ............... | G06F 40/103 715/800 |
| 2017/0212944 A1* | 7/2017 | Hellman | ............ | G06F 16/2423 |

* cited by examiner

CUSTOMIZABLE AND ANIMATABLE POPUP CARD SYSTEM

BACKGROUND

Effective user experience ("UX") interfaces are becoming more important as efficiency, user-friendliness, intuitiveness, and functionality mark distinctions among the plethora of software applications ("apps") and programs for users to select for use. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for a popup card system with animatable popup cards and popup card user interface ("UI") elements, with location awareness and scrolling awareness functionality. The UX that is generated and displayed by the popup card system is adaptive to a multitude of scenarios and app (e.g., window) surfaces, and the user experience ("UX") is responsive to a variety of user inputs (including via mouse, keyboard, pen/stylus, touch, and voice). Transitioning between popup card states and/or between corresponding popup cards is smooth and seamless, and is anchored within the UI or app window, without need for users to navigate to another page or app to complete an action triggered by user input. Such features promote a more efficient use of screen real estate while also improving the usability and interaction performance of the interface.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

DETAILED DESCRIPTION OF CERTAIN EMBODIMENTS

Figure 1:
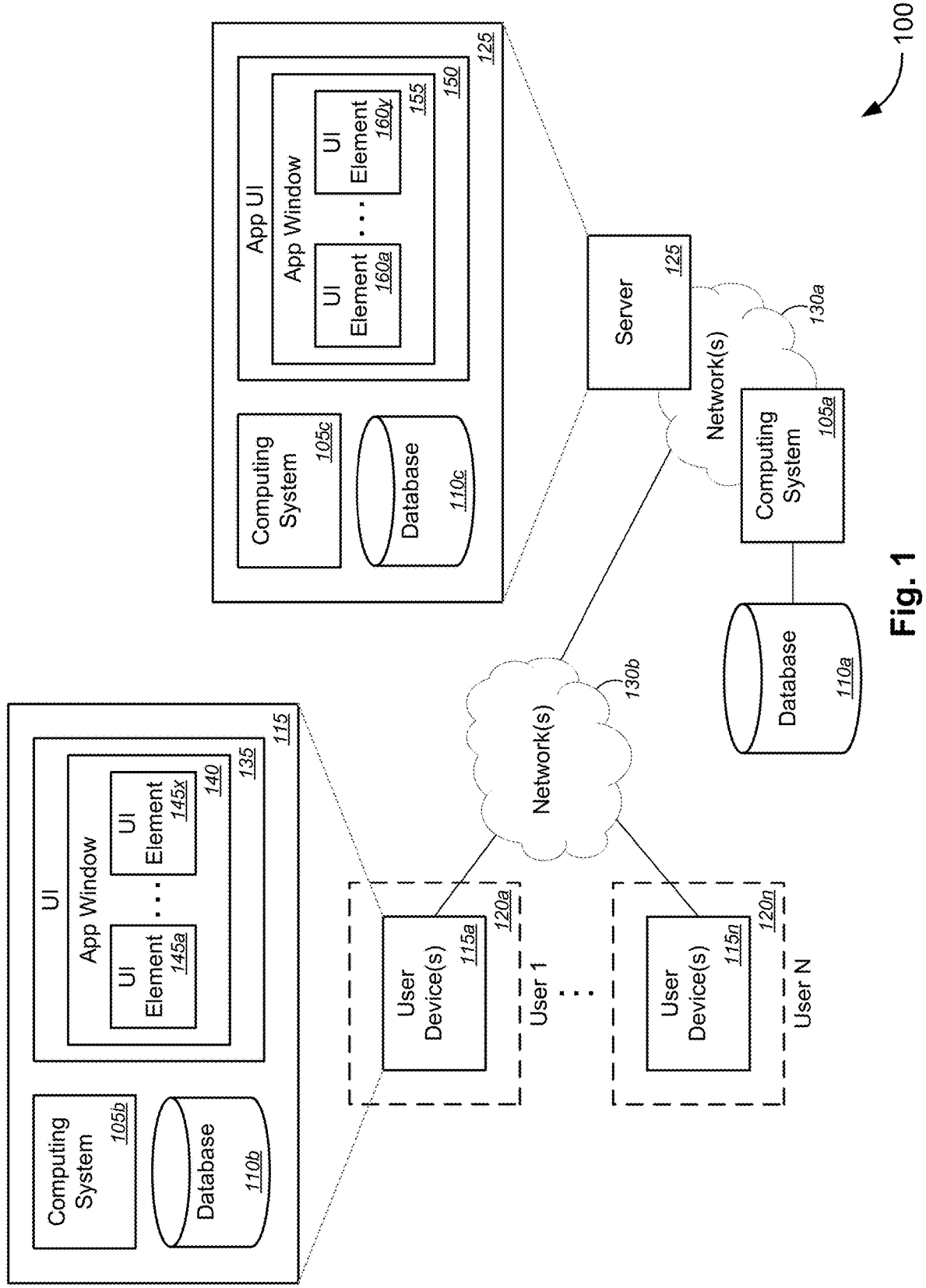
FIG. 1 depicts an example system for implementing a customizable and animatable popup card system.

Traditionally, users must navigate to different applications or whole new pages within an application to get more context about something they want to drill into (e.g., a movie, a television show, a music video, a game, a product listing, a document, cloud-based search results, or local search results). This causes friction in the users' workflow and can prevent users from searching deeper details if their threshold of interest has not been met. Moreover, additional processing and display cycles are wasted when a user does drill into a new page or separate application. The technology of the present application overcomes these issues, among others, by providing an efficient way for developers to smoothly transition between views within the same context. This technology allows for a deeper level of detail to be provided, with minimal user interaction, and without obstructing or impacting the user's experience.

The approach as described herein (and referred to herein as the popup card system) is able to freely expand a user interface ("UI") element or feature to show more information that the users may want to view in order to make a decision. For a UI element, such as a card on the screen that describes a product or other feature, interaction by a user (e.g., by hovering or pressing on the UI element) causes the UI element to change (e.g., to pop up or to otherwise expand in a non-pop-up manner) to become a bigger card with more information. As used herein, the term "pop up" or "popup" is used to refer to such change. Beyond this transition UX, the popup card system, as briefly described above, is adaptive to a multitude of scenarios and app (e.g., window) surfaces, and the popup is responsive to a variety of user inputs (including via mouse, keyboard, pen/stylus, touch, and voice). The popup card system includes animatable popup cards and popup card UI elements that may allow for every element inside the card, or a subset thereof, to be animated in whatever ways that a developer defines, not just the card frame itself. Elements that look the same or similar across the different card versions or states can be animated via 'connected animations' (e.g., animations that are linked to produce coordinated animations among two or more elements or sub-elements). Such connections of animations provide a visual cue to the user to track corresponding elements across the changes in state of the card, which leads to improved understanding and usability of the data displayed as the cards change state. The popup card system also supports offset, opacity, scale, clip (e.g., selectively enabling or disabling rendering operations), shadow, and many other types of animations or a combination of any of these animations.

The popup card system may also be location aware based on where the display of the popup card is triggered. For instance, the popup card may automatically expand to the right, if it is next to the left edge of the frame or screen, or to the left if it is next to the right edge of the frame or screen. The popup card is also scrolling aware. For instance, a displayed popup card may remain fully displayed through a scroll (or during page-up or page-down) until the underlying triggering element is scrolled (or otherwise moved) off-screen, at which point the popup card automatically closes (shrinking back to its original location in an animated fashion). Unlike conventional or native popup or flyout controls, one need not dismiss the popup card during scrolling (or paging up or down), which allows users to naturally scroll (or page through) a list without explicitly having to dismiss the popup card. The popup card can be smoothly transitioned into any size, in an animated fashion. This allows creation of visually appealing UXs that are adaptive to a variety of scenarios. For marketplace UI applications, the popup card system can display trailers for games and movies when a cursor hovers over or on product cards within the app window. In examples, an inline-install feature may be included that allows users to directly install an app or a game on the popup card of a search result, with such functionality in some cases being expanded to all cards beyond just those returned from a search. Custom app collections may also be created using the popup card system.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

We now turn to the embodiments as illustrated by the drawings. FIGS. 1-7 illustrate some of the features of a method, system, and apparatus for implementing user experience functionalities, and, more particularly, to methods, systems, and apparatuses for implementing a customizable and animatable popup card system, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

FIG. 1 depicts an example system 100 for implementing a customizable and animatable popup card system. System 100 includes computing system 105a and corresponding database 110a, one or more user devices 115a-115n (collectively, "user devices 115") associated with users 1 through N 120a-120n (collectively, "users 120"), and, in some cases, a server 125. In examples, computing system 105a and corresponding database 110a—and, where applicable, server 125—may be located within, disposed within, or communicatively coupled to network(s) 130a. In examples, user devices 115a-115n may be communicatively coupled to network(s) 130b, which is in communication with network(s) 130a. In some cases, networks 130a and 130b may be the same network(s) or same group of networks. In other cases, networks 130a and 130b may be separate networks or separate groups of networks. Networks 130a and 130b (collectively, "network(s) 130") may each include at least one of a distributed computing network, such as the Internet, a private network, a commercial network, or a cloud network, and/or the like.

In some examples, at least one user device 115 may each include computing system 105b and corresponding database 110b, as well as UI 135. A software application ("app") window 140 may be displayed within the UI 135, and within the app window 140 may be displayed one or more UI elements 145a-145x (collectively, "UI elements 145"). Similarly, the server 125 may include computing system 105c, which may be communicatively coupled to corresponding database 110c. The server 125 may host or include a UI 150 (including an app UI, a web portal UI, or other UI). An app window 155 may be displayed within UI 150, and within the app window 155 may be displayed one or more UI elements 160a-160y (collectively, "UI elements 160"). In some cases, two or all of n, x, and y in the reference numerals for the user devices 115a-115n, the UI elements 145a-145x, and the UI elements 160a-160y may be of the same value or number. In other cases, each of n, x, and y may be of different values or numbers.

In some embodiments, the computing system 105b may each include at least one of a processor or set of processors, a mobile device computing system, or an orchestrator. In some examples, the computing systems 105a and 105c may each include at least one of an orchestrator, a server, a cloud computing system, or a distributed computing system. In some instances, the user devices 115 may each include one of a desktop computer, a laptop computer, a tablet computer, a smart phone, a mobile phone, or any suitable device capable of communicating with network(s) 130 or with servers or other network devices within network(s) 130. In some examples, the user devices 115 may each include any suitable device capable of communicating with at least one of the computing systems(s) 105a and/or 105c, and/or the like, via a communications interface. The communications interface may include an app-based portal (e.g., app UI 150 hosted on server 125) or a web-based portal, an application programming interface ("API"), a server, an app, or any other suitable communications interface (not shown), over network(s) 130. In some cases, users 120 may each include one of an individual, a group of individuals, or agent(s), representative(s), owner(s), and/or stakeholder(s), or the like, of any suitable entity. The entity may include a private company, a group of private companies, a public company, a group of public companies, an institution, a group of institutions, an association, a group of associations, a governmental agency, or a group of governmental agencies.

In some examples, the UI 135 or 150 may include app UIs (e.g., app UI 150), web portal UIs, digital marketplace UIs, digital media content UI, display screen UIs, or touchscreen UIs. According to some embodiments, the app window 140 or 155 may be a window of an app including a digital marketplace app, a digital media content app, a gaming app, or a user experience ("UX") app. Each UI element 145a-145x or 160a-160y may include a rest UI element or card, a sub-window, a sub-panel, a tile, or an interactive icon. As shown in FIGS. 2-5, each UI element 145 or 160 may include one or more sub-elements.

In operation, computing systems 105a, 105b, and/or 105c (collectively, "computing system") may perform methods for implementing a customizable and animatable popup card system, as described in detail with respect to FIGS. 2-5. For example, the following functionalities may be applied with respect to the operations of system 100 of FIG. 1. FIGS. 2A-2D as described below are directed to an example user experience 200 associated with edge awareness functionalities within app windows. FIGS. 3A-3C as described below are directed to an example user experience 300 associated with scrolling or scroll awareness functionalities within app windows. Herein, scroll awareness functionalities include awareness in response to a scroll operation and/or a page-up or page-down operation. FIGS. 4A-4C as described below are directed to an example user experience 400 associated with pop-up card expansion functionalities. FIGS. 5A-5F as described below are directed to an example user experience 500 associated with various pop-up card animation functionalities for app collection visualizations.

FIGS. 2A-2D depict diagrams illustrating an example UX 200 when implementing a customizable and animatable popup card system with left/right edge awareness functionalities within app windows. In the example UX 200 of FIGS. 2A-2D, UI 205, app window 210, and UI elements 215a-215g, 260a, 260c, and 260g may be similar, if not identical, to UI 135 or 150, app window 140 or 155, and UI elements 145a-145x or 160a-160y, respectively, of system 100 of FIG. 1. The description of these components of system 100 of FIG. 1 are similarly applicable to the corresponding components of FIGS. 2A-2D.

With reference to FIGS. 2A-2D, an example UI 205 may include an app window 210 for a digital marketplace app, as well as a plurality of interactive icons and user input fields. In examples, the interactive icons and input fields may include a search field, a search icon, an account icon, a minimize icon, a maximize icon, a close icon, a home icon, an apps icon, a gaming icon, a movies & TV icon, a library icon, and/or a help icon. Within the app window 210 may be displayed one or more rest UI elements 215a-215g (collectively, "rest UI elements 215"). In the example UX 200 of FIGS. 2A-2D, rest UI elements 215 are cards corresponding to apps that a user can download, install, and/or purchase through the UI 205. In examples, a rest UI element 215 may be a static UI element. In other examples, a rest UI element 215 may be a dynamic UI element. In either case, the rest UI element 215 may refer to a non-expanded UI element that is initially displayed within an app window, prior to interaction by a user. In an example, each card or rest UI element 215 may have the same height $h_1$ and the same width $w_1$. In other examples, some cards or rest UI elements 215 may have different heights and widths compared to other cards or rest UI elements 215 within the same app window 210 or within the same UI 205 (not shown).

Each card or rest UI element 215 may include one or more UI sub-elements (e.g., UI sub-elements 220a, 220b, 225a, 225b, 230a, 230b, 235a, 235b, 240a, 240b, 245a, 245b, 250a, and/or 250b). For example, rest UI elements 215a-215g may include UI sub-elements 220, 225, 230, 235, 240, 245, and 250, respectively. UI sub-elements 220a, 225a, 230a, 235a, 240a, 245a, and 250a (denoted in FIGS. 2A-2D by various fill patterns) may each include at least one of an image sub-element, a graphic sub-element, a video field sub-element, or other visual sub-element. UI sub-elements 220b, 225b, 230b, 235b, 240b, 245b, and 250b may each include at least one of a text field, a description field, an app name or title field, a developer or publisher field, a marketing icon, an advertisement or marketing field, a genre field (e.g., entertainment, music, utilities and tools, gaming, action and adventure, puzzle and trivia, casino), a ratings field (e.g., star ratings field), a status field (e.g., owned, installed, free, price for rent, or price for purchase), an expand card button, a screenshot or example UI field, a share button, or a purchase, rent, or obtain button. Some of these fields or buttons may be combined or arranged within a same portion of the rest UI element 215.

In operation, the customizable and animatable popup card system may be implemented with left/right edge awareness functionalities within app windows, as follows. First, the system or computing system (e.g., computing system 105a, 105b, and/or 105c of system 100 of FIG. 1) may receive first user input corresponding to interaction with a rest UI element 215 that is displayed within app window 210 that is displayed within a display screen of a user device (e.g., user device 115a-115n of system 100 of FIG. 1). In some examples, the first user input may include one of moving a cursor displayed in the app window to hover over a portion of the rest UI element, single clicking or single tapping a portion of the rest UI element, long pressing a portion of the rest UI element, double clicking or double tapping while the cursor is over a portion of the rest UI element, scrolling up or down within the app window, paging up or down within the app window, tabbing between UI elements displayed within the app window, pinching a portion of the rest UI element, swiping a portion of the rest UI element, or voice input. Voice input may include speaking commands like "click," "double click," "select," "highlight," "enter," "expand," "collapse," "scroll up," "scroll down," "page up," "page down," "play," "pause," "stop," "replay," "forward," "rewind," "skip," "increase volume," "decrease volume," or "mute." Alternatively or additionally, the system or computing system may detect when a cursor (e.g., cursor 255) is above a portion of the rest UI element 215. Alternatively or additionally, the system or computing system may detect when the rest UI element 215 is being highlighted or selected (not shown). In response to receiving the first user input, detecting the position of the cursor, and/or detecting highlighting or selection of a rest UI element, the system or computing system may determine whether coordinates of a rest UI element as displayed within the app window indicate that the rest UI element either lies beyond or lies within a first threshold distance from a left edge 210L or right edge 210R (or side boundaries) of the app window 210.

The system or computing system generates a popup UI element 260, the popup UI element 260 being different from the corresponding rest UI element 215. The system or computing system maps sub-elements of the rest UI element (e.g., UI sub-elements 220a, 220b, 225a, 225b, 230a, 230b, 235a, 235b, 240a, 240b, 245a, 245b, 250a, and/or 250b) to corresponding sub-elements of the popup UI element (e.g., popup UI sub-elements 220a', 220b', 225a', 225b', 230a', 230b', 235a', 235b', 240a', 240b', 245a', 245b', 250a', and/or 250b'), and displays the popup UI element within the app window 210, in some cases, overlaid above at least a portion of the corresponding rest UI element 215. Herein, sub-elements having similar reference numerals correspond to each other (e.g., sub-element 220a corresponds to sub-element 220a' and one is mapped to the other), while prime notation ('), double prime notation ("), triple prime notation ('''), and so on, denote sub-elements of a first popup card, a second popup card, a third popup card, and so on. In some examples, each sub-element may have an identifier ("ID"). In some cases, corresponding sub-elements may share the same ID or may have IDs that are similar and/or that are linked to each other. For example, app image sub-element 220a may have an ID (e.g., ABC) that is the same as the ID (e.g., ABC) for app image sub-element 220a', and mapping these two sub-elements includes mapping by identifying matching IDs. Alternatively, mapping may be performed based on use of pointers between IDs of sub-elements.

The system or computing system may also cause animation of at least one sub-element of the popup UI element during display of the popup UI element. In some examples, animation of a sub-element among the at least one sub-element as displayed within the app window may include at least one of changing positional offset parameters of the sub-element within the app window, changing a level of opacity of the sub-element, changing one or more colors of the sub-element, selectively enabling or disabling rendering of at least portions of the sub-element, changing a size or scale of the sub-element, changing a shape of the sub-element, changing shadow effects of the sub-element, revealing additional sub-elements, hiding the sub-element, playing a video clip within the sub-element, or replacing the sub-element with a media playback UI sub-element. In examples, animation may be delayed (e.g., by 200 ms) to provide particular animation effects. In some cases, a slow mode may be activated in which multiple animations may be displayed in the background of the UI 205 or the app window 210. In some examples, animations may be connected or coordinated (e.g., animating toward a direction or tracing a pattern).

In an example, each popup card or popup UI element 260 may have the same height $h_2$ and the same width $w_2$ compared with the heights and widths of other popup UI elements 260 in the same app window 210 or within the same UI 205. In either case, the height $h_2$ and the width $w_2$ of each popup card or popup UI element 260 is different (either larger or smaller) than the height $h_1$ and the width $w_1$ of its corresponding rest UI element 215. In other examples, some popup cards or popup UI elements 260 may have different heights and widths compared to other popup cards or popup UI elements 260 within the same app window 210 or within the same UI 205 (not shown). Each popup card or popup UI element 260 may include one or more popup UI sub-elements (e.g., popup UI sub-elements 220a', 220b', 225a', 225b', 230a', 230b', 235a', 235b', 240a', 240b', 245a', 245b', 250a', and/or 250b'). For example, popup UI elements 260a-260g may include popup UI sub-elements 220', 225', 230', 235', 240', 245', and 250', respectively. Popup UI sub-elements 220a', 225a', 230a', 235a', 240a', 245a', and 250a' (denoted in FIGS. 2B-2D by various fill patterns) may each include at least one of an image sub-element, a graphic sub-element, a video field sub-element, interactive video playback icons or buttons, or other visual sub-element, and, in some cases, may also include at least one of an interactive sound icon or button, interactive audio playback icons or buttons, an interactive volume icon or button, or an interactive mute icon or button. In some instances, the interactive video or audio playback icons or buttons may include functionalities including play, pause, rewind, forward, fast rewind, fast forward, jump backward by z seconds, jump forward by z seconds, or skip. UI sub-elements 220b', 225b', 230b', 235b', 240b', 245b', and 250b' may each include at least one of a text field, a description field, an app name or title field, a developer or publisher field, a marketing icon (e.g., thumb-up icon or trending icon), an advertisement or marketing field, a genre field (e.g., entertainment, music, utilities and tools, gaming, action and adventure, puzzle and trivia, casino), a ratings field (e.g., star ratings field), a status field (e.g., owned, installed, free, price for rent, or price for purchase), an expand card button, a screenshot or example UI field, a share button, or a purchase, rent, or obtain button. Some of these fields or buttons may be combined or arranged within a same portion of the popup UI element 260.

The first threshold distance may include at least one of a customizable threshold distance, a default threshold distance, a conditional threshold distance, an adaptable threshold distance, a percentage threshold distance, or a dynamic threshold distance. The customizable threshold distance may be customizable by a developer of the app that is displayed in the app window 210. The default threshold distance may be set by the developer of the app or as a default of the code for left/right edge awareness functionality of the popup card system. The conditional threshold distance may be a threshold distance that changes depending on conditions that may change (e.g., a threshold distance that scales with different widths of rest UI elements). The adaptable threshold distance may be similar to the conditional threshold distance and may adapt to changing conditions (e.g., different widths of the rest UI elements, changes in the UI 205 or app window 210 presentation, etc.). The percentage threshold distance may be a threshold distance that is set to be based on a set percentage width of the rest UI element (either set by the developer or as a default setting of the code for left/right edge awareness functionality). The dynamic threshold distance, like the conditional, adaptable, or percentage threshold distances, may be a variable threshold distance that changes based on conditions of the rest UI element, conditions of the UI 205, conditions of the app window, or conditions of surrounding rest UI elements or surrounding popup UI elements.

Figure 2A:
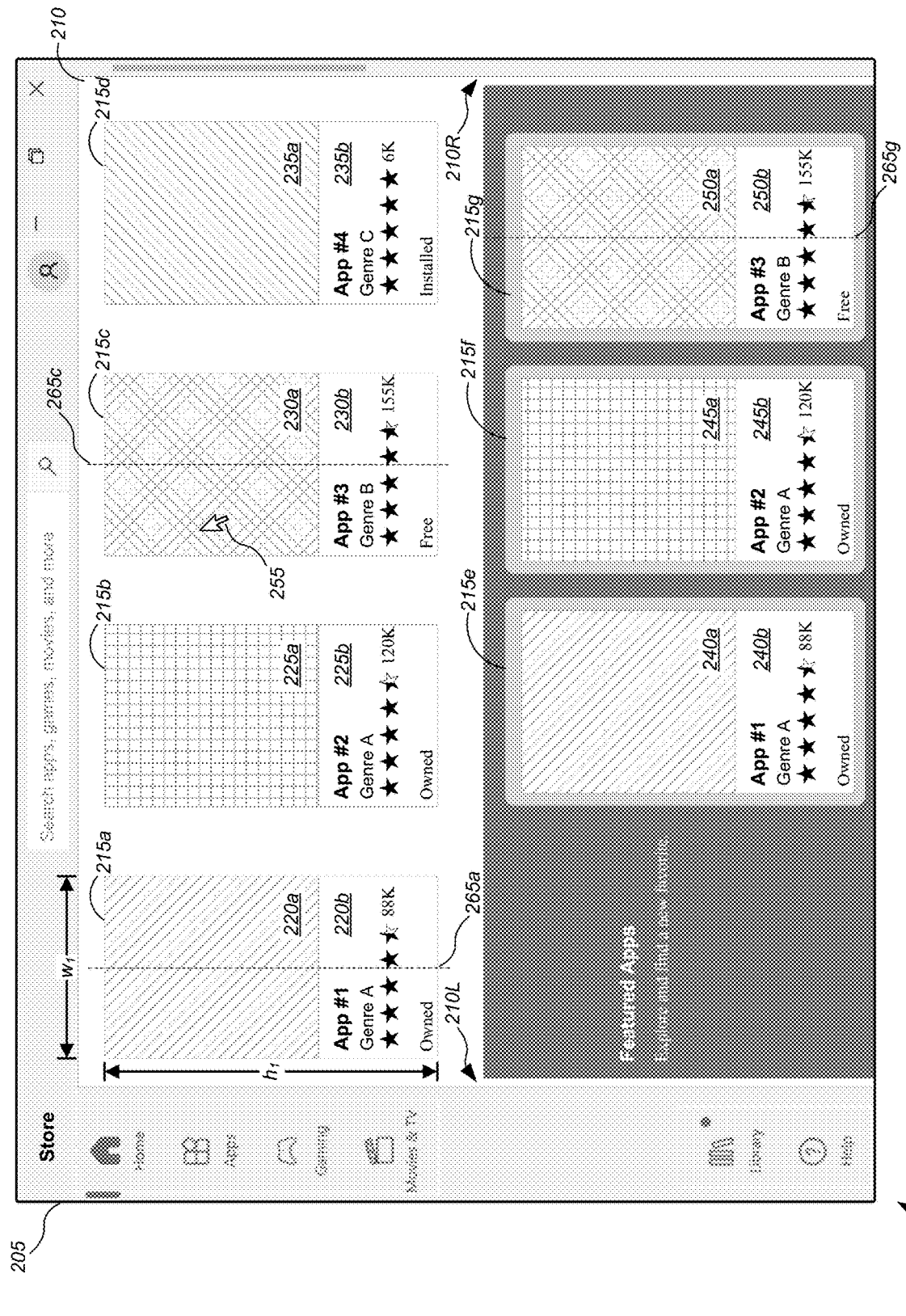
FIGS. 2A-2D depict diagrams illustrating an example user experience when implementing a customizable and animatable popup card system with left/right edge awareness functionalities within software application ("app") windows.
Figure 2B:
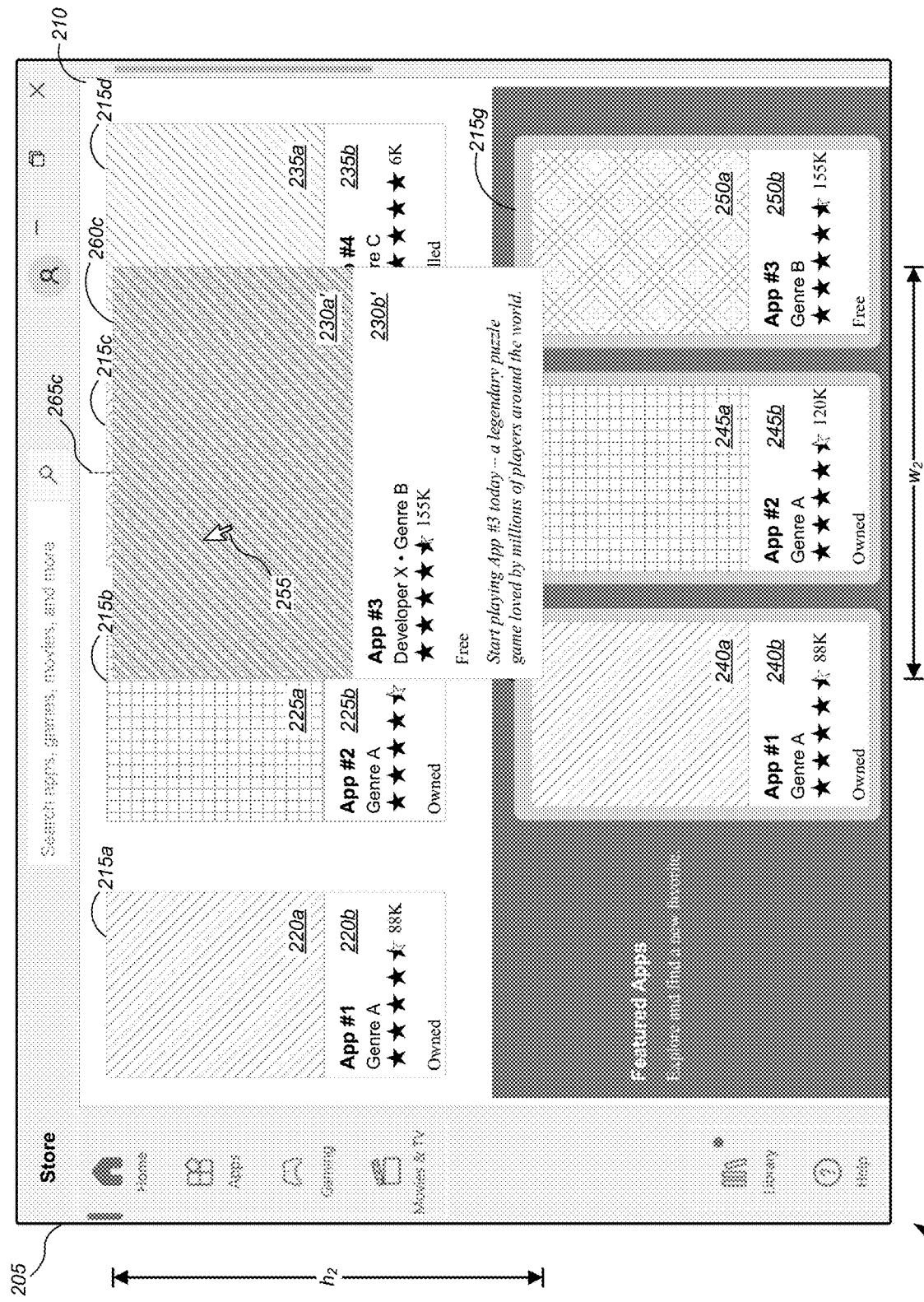

The first threshold distance sets a threshold within which the system causes a popup UI element 260, which is generated and displayed, to be shifted from the left edge 210L or the right edge 210R of the app window 210. If coordinates of the rest UI element 215—with which the user interacts, above which the cursor is positioned, or of which is highlighted or selected—indicate that the rest UI element lies beyond the first threshold distance from a left edge 210L or right edge 210R of the app window 210, then the system or computing system causes the corresponding popup UI element to be displayed in a first mode. The first mode may include displaying the popup UI element overlaid above at least a portion of the rest UI element in a position that is centered above a horizontal center of the rest UI element between a left edge and a right edge of the rest UI element. In an example, as shown in FIG. 2B, popup UI element 260c is shown overlaid above at least a portion of rest UI element 215c in a position that is centered above a horizontal center (denoted in FIGS. 2A and 2B by dashed line 265c) of the rest UI element 215c between a left edge and a right edge of the rest UI element 215c.

Figure 2C:
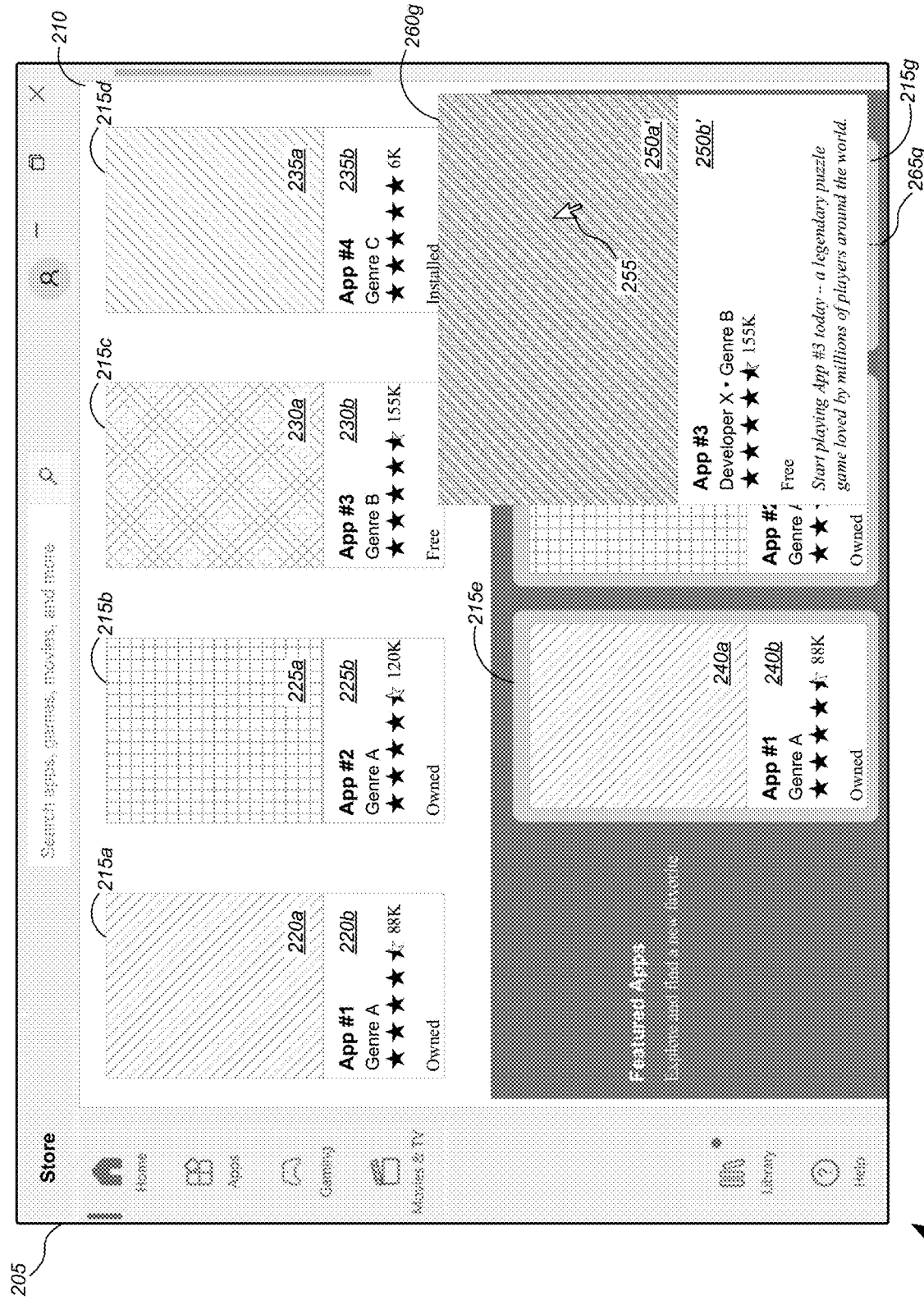

If coordinates of the rest UI element 215 as displayed within the app window 210 indicate that the rest UI element 215 lies within the first threshold distance from a right edge 210R of the app window 210, then the system or computing system causes the corresponding popup UI element to be displayed in a second mode. The second mode may include displaying the popup UI element in a position that is offset from the horizontal center of the rest UI element such that a right edge of the popup UI element is displayed to the left of the right edge of the app window. In an example, as shown in FIG. 2C, popup UI element 260g is shown overlaid above at least a portion of rest UI element 215g in a position that is offset from the horizontal center (denoted in FIGS. 2A and 2C by dashed line 265g) of the rest UI element 215g such that a right edge of the popup UI element 260g is displayed to the left of the right edge 210R of the app window 210.

Figure 2D:
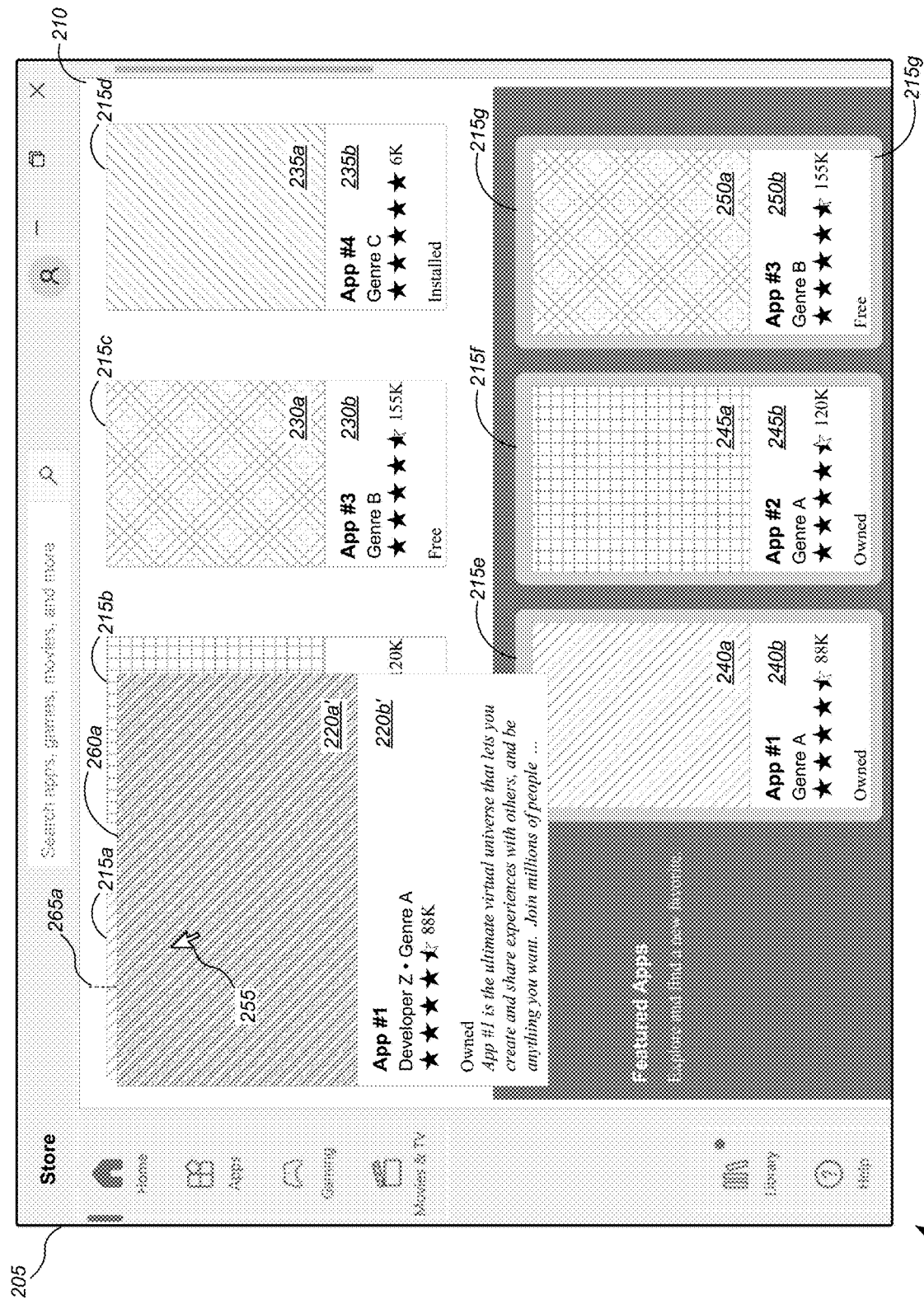

If coordinates of the rest UI element 215 as displayed within the app window 210 indicate that the rest UI element 215 lies within the first threshold distance from a left edge 210L of the app window 210, then the system or computing system causes the corresponding popup UI element to be displayed in a third mode. The third mode may include displaying the popup UI element in a position that is offset from the horizontal center of the rest UI element such that a left edge of the first popup UI element is displayed to the right of the left edge of the app window. In an example, as shown in FIG. 2D, popup UI element 260a is shown overlaid above at least a portion of rest UI element 215a in a position that is offset from the horizontal center (denoted in FIGS. 2A and 2D by dashed line 265a) of the rest UI element 215a such that a left edge of the popup UI element 260a is displayed to the right of the left right edge 210L of the app window 210.

In some examples, in one or more of the above cases, the popup UI element may be displayed overlaid above at least a portion of its corresponding rest UI element. Although the popup UI elements 260c, 260g, and 260a are shown in FIGS. 2B-2D, respectively, as each overlaying most, but not all, of its corresponding rest UI element 215c, 215g, or 215a, the popup UI element may alternatively overlay a small portion (as shown in FIG. 3A or 3B), overlay the entire portion (as shown in FIG. 4B, 4C, 5B, or 5C), or overlay no portion (as shown in FIG. 5D-5F) of its corresponding rest UI element.

In the manner as described above and as shown in FIGS. 2A-2D, the system provides left/right edge awareness functionality that smoothly displays and animates popup cards to adjust its display within the app window (to stay within the window and horizontally offset from a center line of its corresponding rest UI element). This functionality applies when the system determines that the rest card or rest UI element is near the left edge or the right edge of the app window.

Figure 3A:
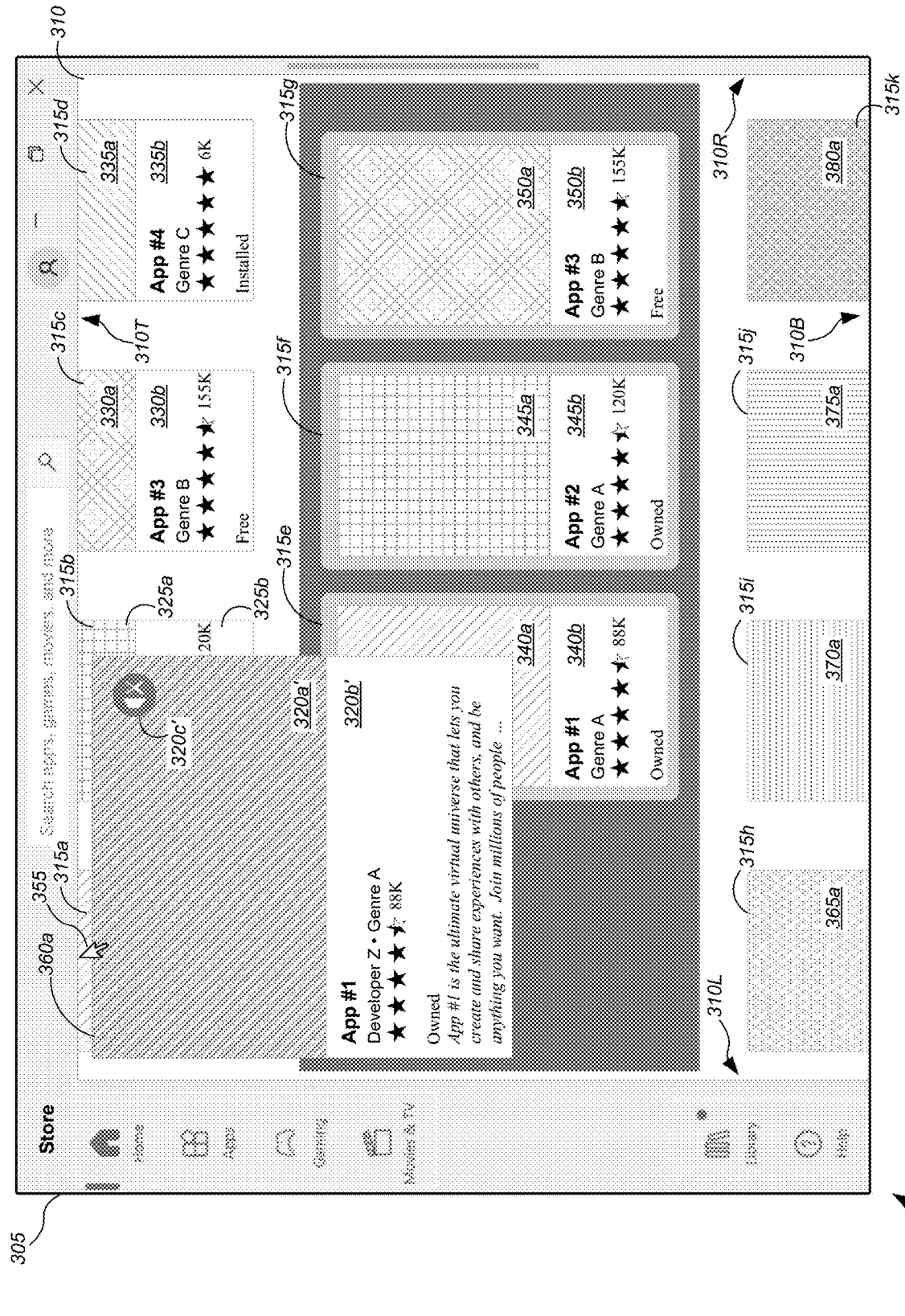
FIGS. 3A-3C depict diagrams illustrating an example user experience when implementing a customizable and animatable popup card system with scrolling awareness functionalities within app windows.
Figure 3B:
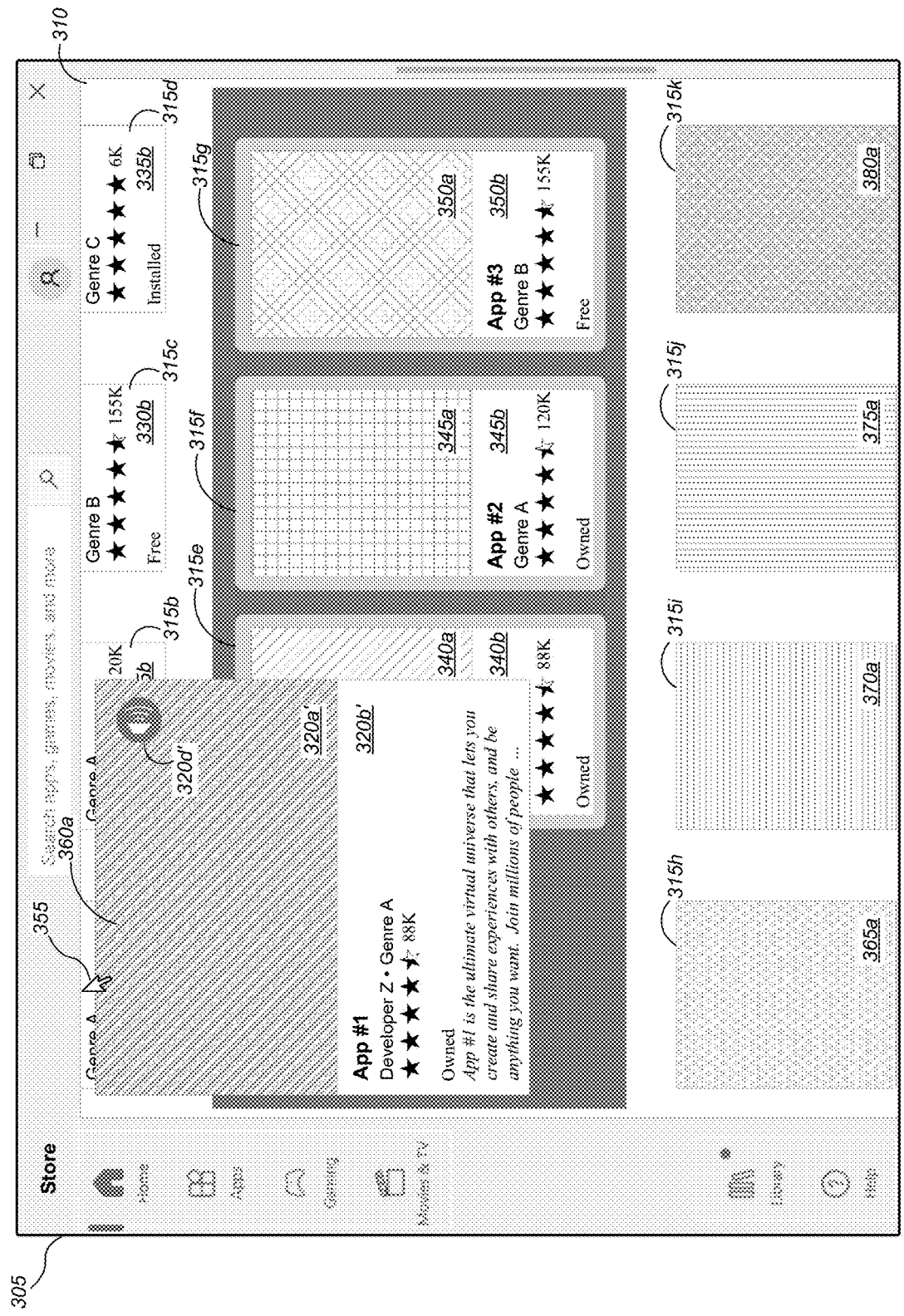
Figure 3C:
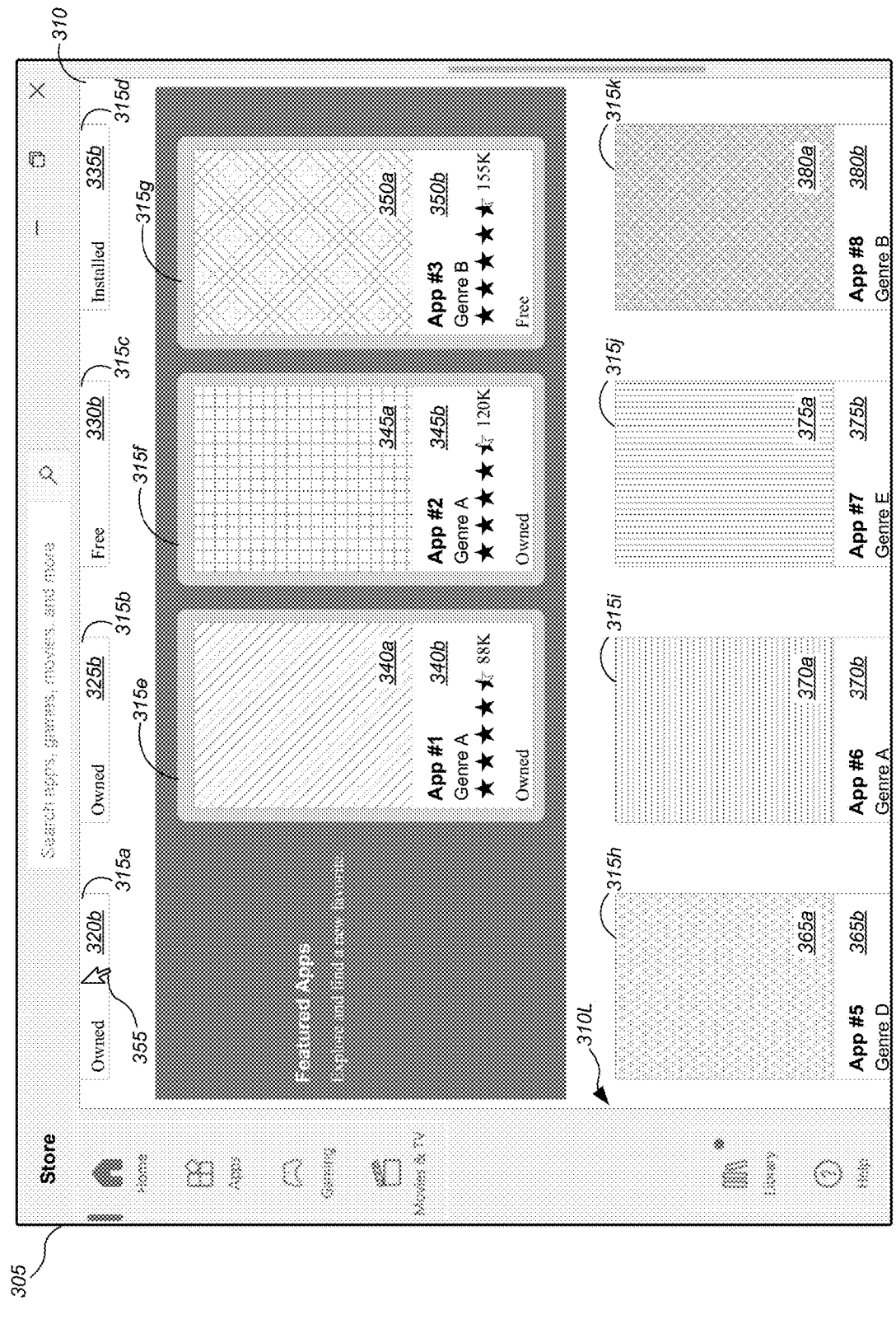

FIGS. 3A-3C depict diagrams illustrating an example UX 300 when implementing a customizable and animatable popup card system with scrolling awareness functionalities within app windows. As described above, scrolling awareness functionalities, as referred to herein, may include a scroll operation, a page-up or page-down operation, and/or similar operation for moving display of content within an app window to view different parts of the content that may extend beyond the app window (collectively referred to as "a scroll operation," which is triggered by "a scrolling input"). In the example UX 300 of FIGS. 3A-3C, UI 305, App window 310, and UI elements 315a-315k and 360a may be similar, if not identical, to UI 135 or 150, App window 140 or 155, and UI elements 145a-145x or 160a-160y, respectively, of system 100 of FIG. 1. The description of these components of system 100 of FIG. 1 are similarly applicable to the corresponding components of FIGS. 3A-3C. UI 305, App window 310, rest UI elements 315a-315k, rest UI sub-elements 320a, 320b, 325a, 325b, 330a, 330b, 335a, 335b, 340a, 340b, 345a, 345b, 350a, 350b, 365a, 365b, 370a, 370b, 375a, 375b, 380a, and 380b, cursor 355, popup UI element 360a, and popup UI sub-elements 320a'-320d' of FIGS. 3A-3C may be similar, if not identical, to UI 205, App window 210, rest UI elements 215a-215g, rest UI sub-elements 220a, 220b, 225a, 225b, 230a, 230b, 235a, 235b, 240a, 240b, 245a, 245b, 250a, and 250b, cursor 255, popup UI elements 260a, 260c, and 260g, and popup UI sub-elements 220a', 220b', 230a', 230b', 250a', and 250b', respectively, of example UX 200 of FIG. 2. The description of these components of example UX of FIG. 2 are similarly applicable to the corresponding components of FIGS. 3A-3C. While the above description has been provided with respect to awareness of left/right edges, the technology may be more generally considered edge aware. The offset may apply to all edges of the screen or window, including the top or bottom edges. For instance, in examples where the app window is horizontally scrollable versus vertically scrollable, the present technology may have top/bottom edge awareness. In some examples, the edge awareness applies to all edges regardless of the scrolling capabilities.

Similar to, and in addition to the left/right edge awareness functionalities as described above with respect to FIGS. 2A-2D, the customizable and animatable popup card system may be implemented with scrolling awareness functionalities within app windows as described below with respect to FIGS. 3A-3C. Scrolling awareness functionalities are triggered, or may otherwise activate passively or reactively, when a cursor is above a portion of the rest UI element or when the rest UI element is being highlighted or selected and a scrolling input is received. In an example, the system or computing system may determine whether coordinates of the rest UI element 315 as displayed within the app window 310 indicate that, during the scroll operation, a portion of the rest UI element 315 has moved above a top edge 310T of the app window 310. Based on a determination that a portion of the rest UI element 315 has moved above a top edge 310T of the app window 310, the system or computing system may determine whether a percentage portion of the rest UI element 310 that remains within the app window 310 exceeds a threshold percentage portion. Based on a determination that the percentage portion exceeds the threshold percentage portion, the system or computing system may continue to display the entire popup UI element 360, within the app window, in a position such that a top edge of the popup UI element 360 is displayed below the top edge 310T of the app window 310 (as shown, e.g., in FIGS. 3B and 3C).

In a similar manner, although not shown in FIG. 3, the system or computing system may determine whether coordinates of the rest UI element 315 as displayed within the app window 310 indicate that, during the scroll, a portion of the rest UI element 315 has moved below a bottom edge 310B of the app window 310. Based on a determination that a portion of the rest UI element 315 has moved below a bottom edge 310B of the app window 310, the system or computing system may determine whether a percentage portion of the rest UI element 310 that remains within the app window 310 exceeds the threshold percentage portion. Based on a determination that the percentage portion exceeds the threshold percentage portion, the system or computing system may continue to display the entire popup UI element 360, within the app window, in a position such that a bottom edge of the popup UI element 360 is displayed above the bottom edge 310B of the app window 310 (not shown). In some examples, in one or more of the above cases, the popup UI element 360 may be displayed overlaid above at least a portion of its corresponding rest UI element 315. In some examples, the percentage portion and the corresponding threshold percentage portion may include one of (A) a percentage of an area of the rest UI element that remains within the app window and a corresponding threshold percentage area (e.g., 10, 20, 30, 40, 50%, or greater, or a range between 10 and 100%); or (B) a percentage of a height of the rest UI element that remains within the app window and a corresponding threshold percentage height (e.g., 10, 20, 30, 40, 50%, or greater, or a range between 10 and 100%).

In some examples, based on a determination that the popup UI element is not currently being displayed and that the percentage portion of the rest UI element that remains within the app window is less than the threshold percentage portion, the popup UI element may be prevented from being displayed within the app window even when an interaction with the rest UI element is received. For example, because a minimal amount of the rest UI element is shown within the app window, it is unlikely that a hover or other interaction with that particular rest UI element is intended to be requested to further drill into that rest UI element. As such, by preventing the popup UI element from being displayed, interactions that are likely unintentional are avoided, leading to less erroneous displays of popup UI elements.

Alternatively, it may be determined whether the popup UI element is currently being displayed and whether the percentage portion of the rest UI element that remains within the app window has fallen below the threshold percentage portion. Based on such determinations, the popup UI element (and its sub-elements) may be caused to be animated to transition between a first state and a second state. In some instances, the first state and the corresponding second state may include one of the following: (a) a full height and a zero height; (b) a full width and a zero width; (c) a full area and a zero area; (d) a full opaque display and a full transparent display; or (e) a fully visible display and a fully hidden display. FIG. 3C depicts the results of such transition from the first state to the second state. While the above description has been provided with respect to awareness in response to scrolling up or down (or paging-up/paging down), the technology may be more generally considered to also include functionalities in response to side scrolling. For instance, in examples where the app window is horizontally scrollable versus vertically scrollable, the present technology may function in a similar manner when the rest UI element moves beyond a left or right edge of the app window. In some examples, the scrolling awareness applies to all edges, such as when the app window is able to scroll up, down, left, and right.

Figure 4A:
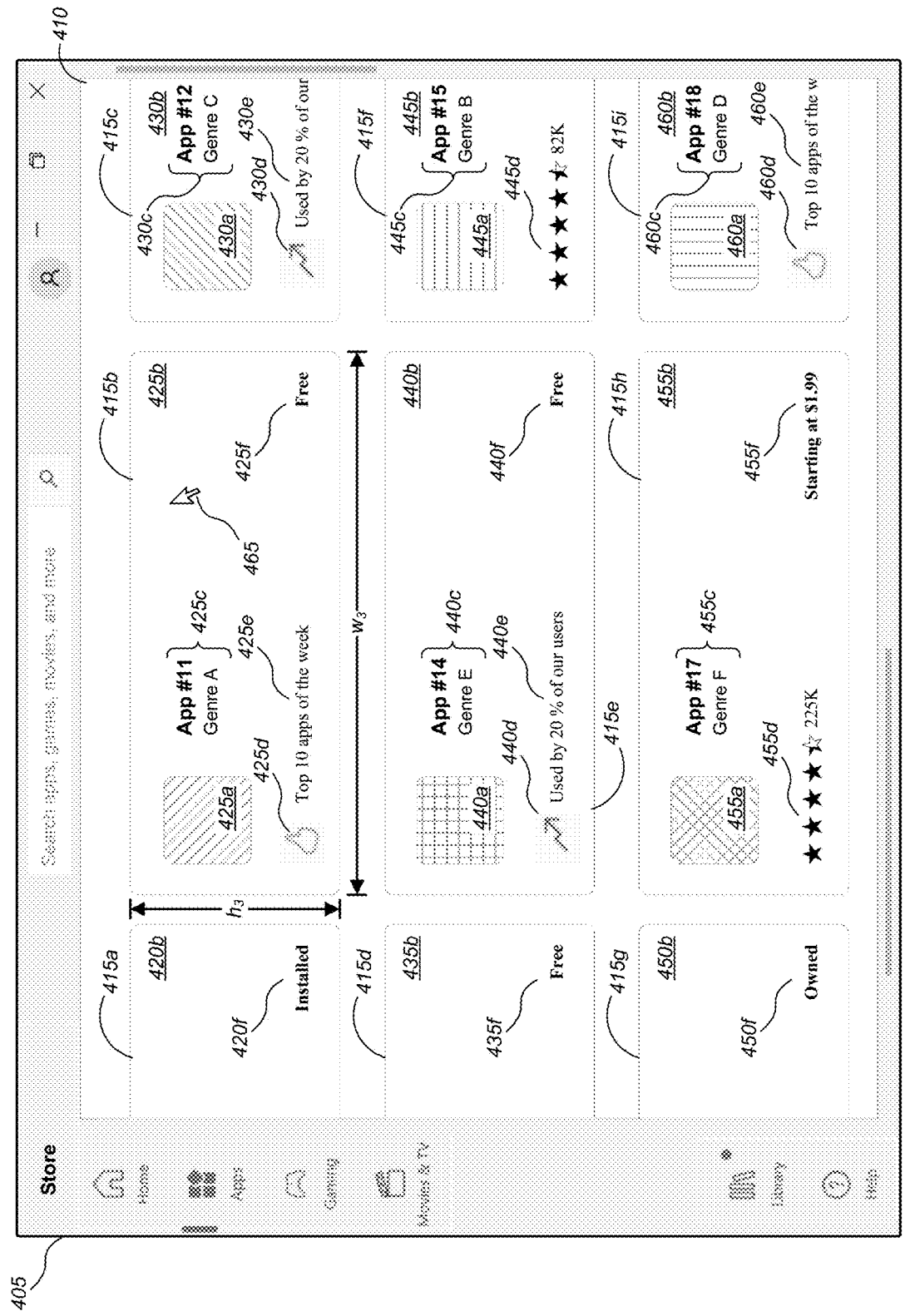
FIGS. 4A-4C depict diagrams illustrating an example user experience when implementing a customizable and animatable popup card system with pop-up card expansion functionalities.
Figure 4B:
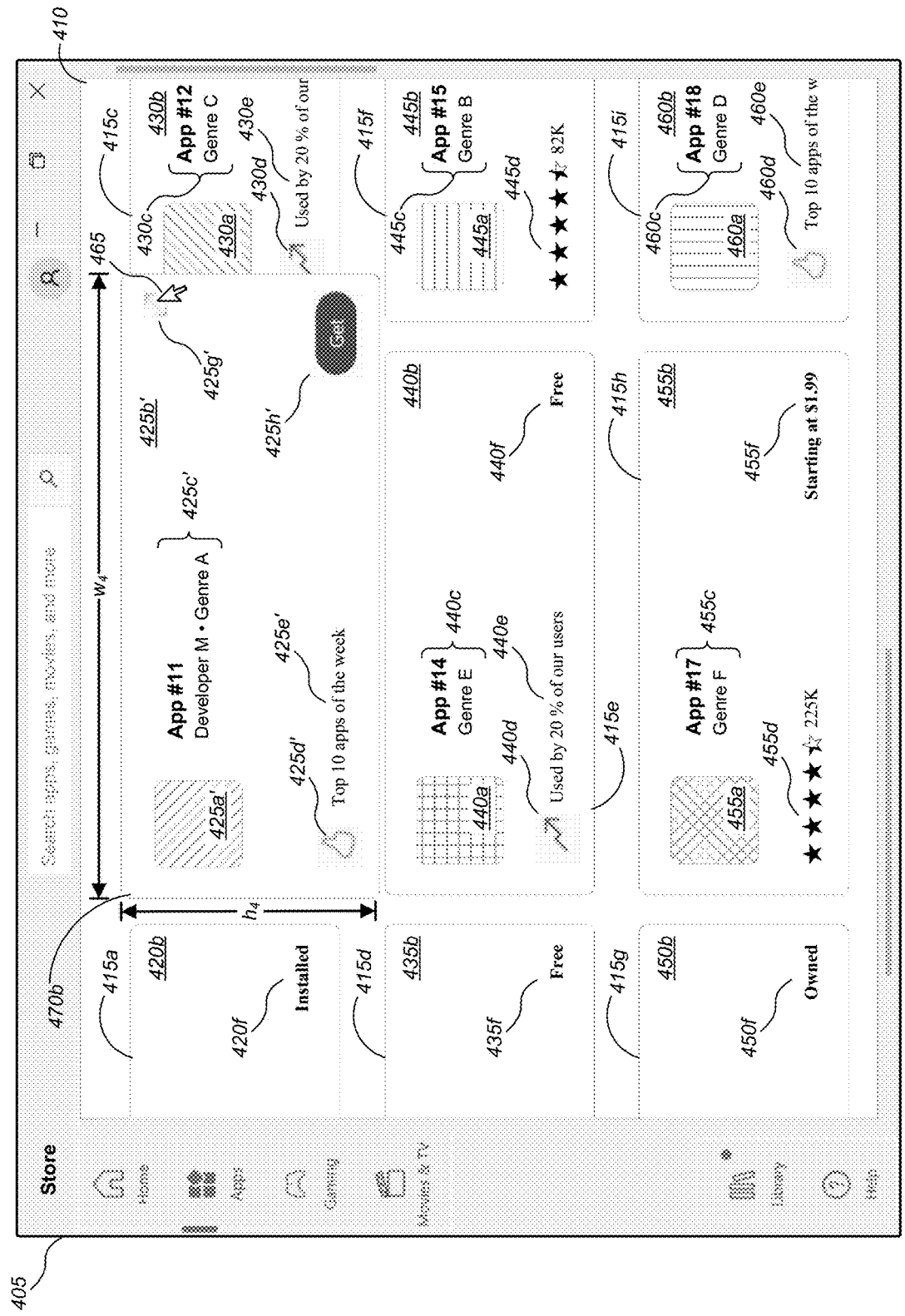
Figure 4C:
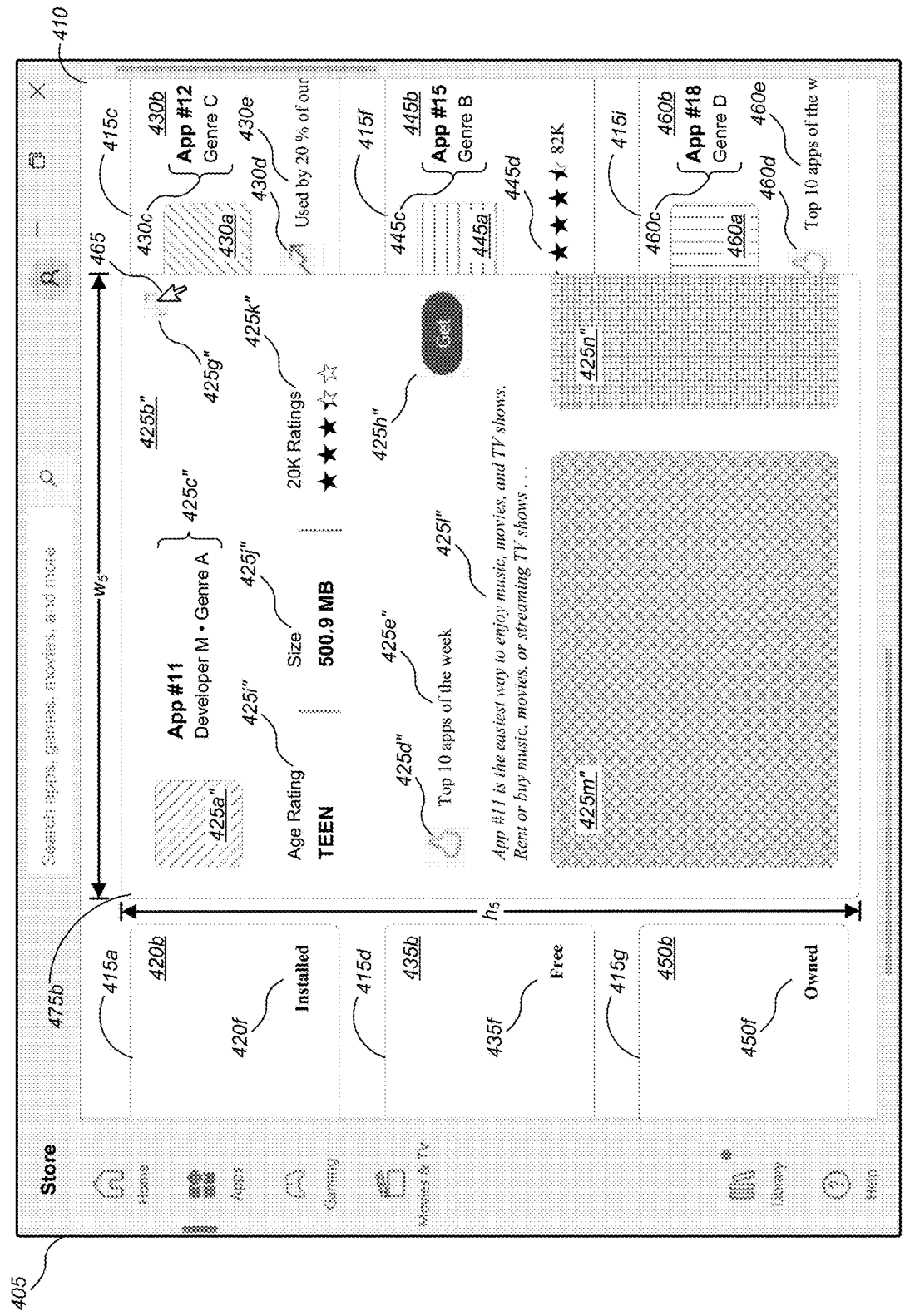

FIGS. 4A-4C depict diagrams illustrating an example UX 400 when implementing a customizable and animatable popup card system with pop-up card expansion functionalities. In the example UX 400 of FIGS. 4A-4C, UI 405, App window 410, and UI elements 415*a*-415*i*, 470*b*, and 475*b* may be similar, if not identical, to UI 135 or 150, App window 140 or 155, and UI elements 145*a*-145*x* or 160*a*-160*y*, respectively, of system 100 of FIG. 1. The description of these components of system 100 of FIG. 1 are similarly applicable to the corresponding components of FIGS. 4A-4C. UI 405, App window 410, rest UI elements 415*a*-415*i*, rest UI sub-elements 420*b*, 420*f*, 425*a*-425*f*, 430*a*-430*e*, 435*b*, 435*f*, 440*a*-440*f*, 445*a*-445*d*, 450*b*, 450*f*, 455*a*-455*d*, 455*f*, and 460*a*-460*e*, cursor 465, popup UI elements 470*b* and 475*b*, and popup UI sub-elements 425*a*'-425*e*', 425*g*', 425*h*', 425*a*"-425*e*", and 425*g*"-425*n*" of FIGS. 4A-4C may be similar, if not identical, to UI 205, App window 210, rest UI elements 215*a*-215*g*, rest UI sub-elements 220*a*, 220*b*, 225*a*, 225*b*, 230*a*, 230*b*, 235*a*, 235*b*, 240*a*, 240*b*, 245*a*, 245*b*, 250*a*, and 250*b*, cursor 255, popup UI elements 260*a*, 260*c*, and 260*g*, and popup UI sub-elements 220*a*', 220*b*', 230*a*', 230*b*', 250*a*', and 250*b*', respectively, of example UX 200 of FIG. 2. The description of these components of example UX of FIG. 2 are similarly applicable to the corresponding components of FIGS. 4A-4C.

Further to the example UXs 200 and 300 of FIGS. 2 and 3, displaying a popup UI element (e.g., popup UI elements 470*b* and 475*b*) and/or causing animation of at least one sub-element of the popup UI element (e.g., popup UI sub-elements 425*a*'-425*e*', 425*g*', 425*h*', 425*a*"-425*e*", and 425*g*"-425*n*") may include causing animation of the popup UI element (and its sub-elements) to transition from the second state to the first state (not shown), in a reverse manner to the animations as described above with respect to the transition from the first state to the second state. In examples, displaying a first popup UI element 470*b* and/or causing animation of the at least one sub-element of the first popup UI element (e.g., popup UI sub-elements 425*a*'-425*e*', 425*g*', and 425*h*') may include displaying the first popup UI element 470*b* between a third state to a fourth state. In some instances, the first popup UI element 470*b* in the third state has an initial size that is the same size as the rest UI element 215*b*, which is shown in FIG. 4A and has a height $h_3$ and a width $w_3$. In some cases, the first popup UI element 470*b* in the fourth state (as shown in FIG. 4B) has a final size, with a height $h_4$ and a width $w_4$, that is different from the size of the rest UI element. Displaying the first popup UI element 470*b* between the third state and the fourth state may be performed in a smooth transition by displaying the first popup UI element 470*b* by progressively changing the size of the first popup UI element between its initial size and its final size. In some examples, causing animation of the at least one sub-element of the first popup UI element (e.g., popup UI sub-elements 425*a*'-425*e*', 425*g*', and 425*h*') during display of the first popup UI element 470*b* may include displaying intermediate animations (e.g., size transitions, fading in or fading out, or morphing) of the at least one sub-element as the first popup UI element is being smoothly transitioned between the third state and the fourth state.

The popup card system as described herein is not limited to a single popup card or popup UI element corresponding to each rest UI card or element. Each rest UI card or rest UI element may have any number of corresponding popup cards, each successive popup card transitioning into the next in a manner as described herein. A developer may also choose between morphing a popup card or generating a new popup card and transition between the current popup card and the next one. In cases where the same or similar UI sub-elements are present from one state to the next and there is only a size change in the popup card, morphing of a single card between the two states may be implemented. In cases where a number of different UI sub-elements and/or arrangement of the different UI sub-elements are changed between the two states, generating a new popup card and transition between the two popup cards may be implemented. From the perspective of a user, there is no perceivable difference between morphing a single popup card and transition between two popup cards. The user can interact with a popup card to trigger the transition in either case, e.g., by hovering the cursor or clicking on an interactive expand/collapse icon or button (e.g., expand icon/button 425*g*"), or the like.

In an example, as shown in FIG. 4C, the system or computing system may generate a second popup UI element 475*b*, the second popup UI element 475*b* being different from the rest UI element 415*b* and the first popup UI element 470*b*. At least one of sub-elements of the rest UI element (e.g., rest UI sub-elements 420*b*, 420*f*, 425*a*-425*f*, 430*a*-430*e*, 435*b*, 435*f*, 440*a*-440*f*, 445*a*-445*d*, 450*b*, 450*f*, 455*a*-455*d*, 455*f*, and 460*a*-460*e*) or sub-elements of the first popup UI element (e.g., popup UI sub-elements 425*a*'-425*e*', 425*g*', and 425*h*') may be mapped to corresponding sub-elements of the second popup UI element (e.g., popup UI sub-elements 425*a*"-425*e*" and 425*g*"-425*n*"). In some examples, the second popup UI element 475*b* may be displayed, within the app window, the second popup UI element 475*b* replacing the first popup UI element 470*b*. In some cases, the second popup UI element 475*b* may be displayed overlaid above at least a portion of the rest UI element 415*b*. At least one sub-element of the second popup UI element (e.g., popup UI sub-elements 425*a*"-425*e*" and 425*g*"-425*n*") may be caused to be animated during display of the second popup UI element 475*b*. According to some embodiments, displaying the second popup UI element 475*b* may include displaying the second popup UI element 475*b* between a fifth state to a sixth state. In some cases, the second popup UI element 475b in the fifth state has an initial size that is the same size as the first popup UI element 470b, which has a height $h_4$ and a width $w_5$. In some instances, the second popup UI element 475b in the sixth state has a final size (as shown in FIG. 4C), with a height $h_5$ and a width $w_5$, that is different from the size of the rest UI element 415b (as shown in FIG. 4A) and the size of the first popup UI element 470b (as shown in FIG. 4B). Displaying the second popup UI element 475b between the fifth state and the sixth state may be performed in a smooth transition by displaying the second popup UI element 475b by progressively changing the size of the second popup UI element 475b between its initial size and its final size. In some examples, causing animation of the at least one sub-element of the second popup UI element (e.g., popup UI sub-elements 425a"-425e" and 425g"-425n") during display of the second popup UI element 475b may include displaying intermediate animations (e.g., size transitions, fading in or fading out, or morphing) of the at least one sub-element as the second popup UI element is being smoothly transitioned between the fifth state and the sixth state.

FIGS. 5A-5F depict diagrams illustrating an example UX 500 when implementing a customizable and animatable popup card system with various pop-up card animation functionalities for app collection visualizations. In the example UX 500 of FIGS. 5A-5F, UI 505, App window 510, and UI elements 515a-515d, 540, 550a, 555a, 560a, 565a, and 570a may be similar, if not identical, to UI 135 or 150, app window 140 or 155, and UI elements 145a-145x or 160a-160y, respectively, of system 100 of FIG. 1. The description of these components of system 100 of FIG. 1 are similarly applicable to the corresponding components of FIGS. 5A-5F. UI 505, App window 510, and rest UI elements 515a-515d and 540, rest UI sub-elements 520a-520e, 525a-525d, 530a-530e, and 535a-535d, cursor 545, popup UI elements 550a, 555a, 560a, 565a, and 570a, and popup UI sub-elements 520a'-520d', 520f'-520h', 520a"-520c", 520f", 520g", 520i"-520k", 520a'", 520l'"-520o'", 520a"", and 520a""' of FIGS. 5A-5F may be similar, if not identical, to UI 205, App window 210, rest UI elements 215a-215g, rest UI sub-elements 220a, 220b, 225a, 225b, 230a, 230b, 235a, 235b, 240a, 240b, 245a, 245b, 250a, and 250b, cursor 255, popup UI elements 260a, 260c, and 260g, and popup UI sub-elements 220a', 220b', 230a', 230b', 250a', and 250b', respectively, of example UX 200 of FIG. 2. The description of these components of example UX of FIG. 2 are similarly applicable to the corresponding components of FIGS. 5A-5F.

Figure 5A:
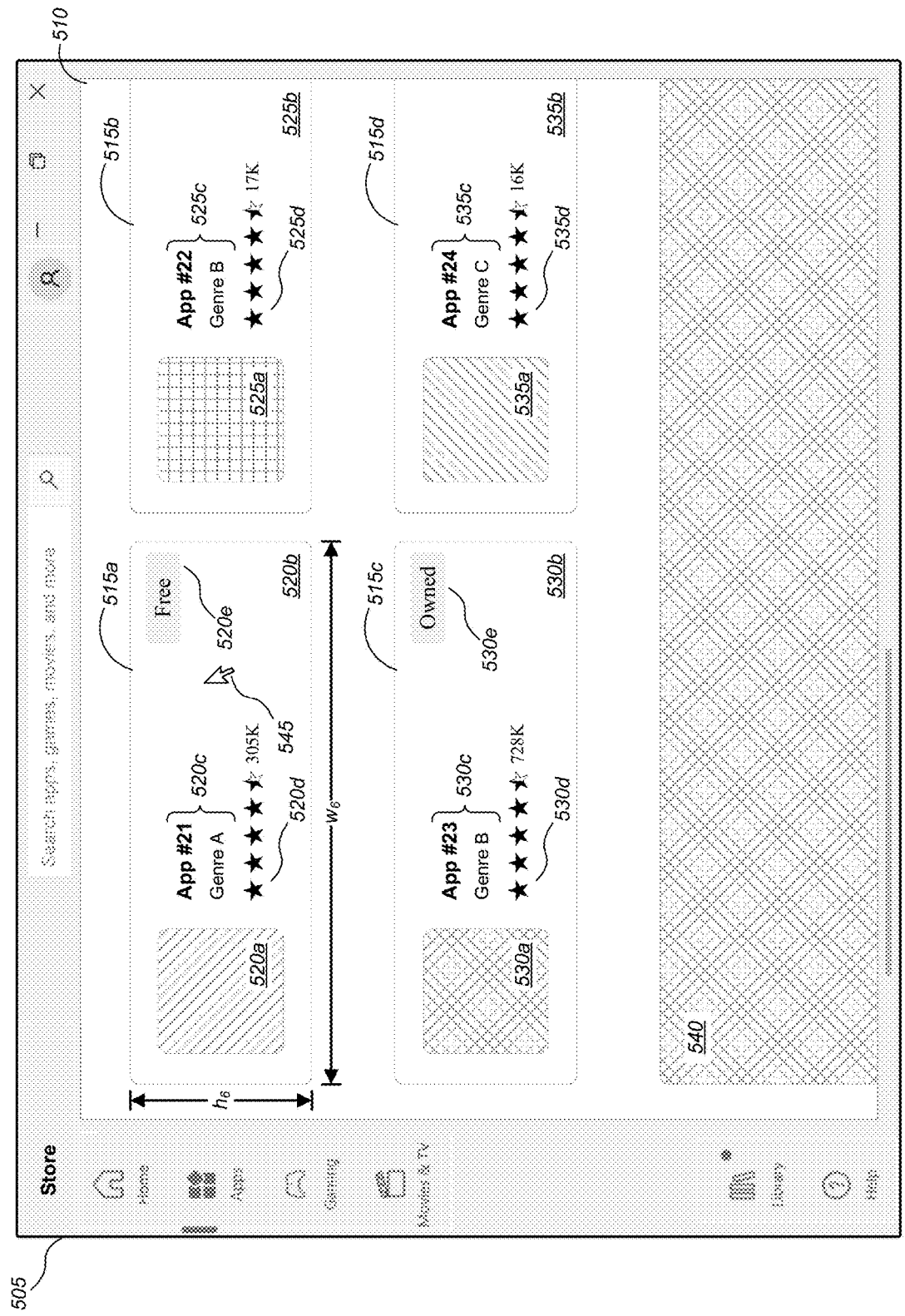
FIGS. 5A-5F depict diagrams illustrating an example user experience when implementing a customizable and animatable popup card system with various pop-up card animation functionalities for app collection visualizations.
Figure 5B:
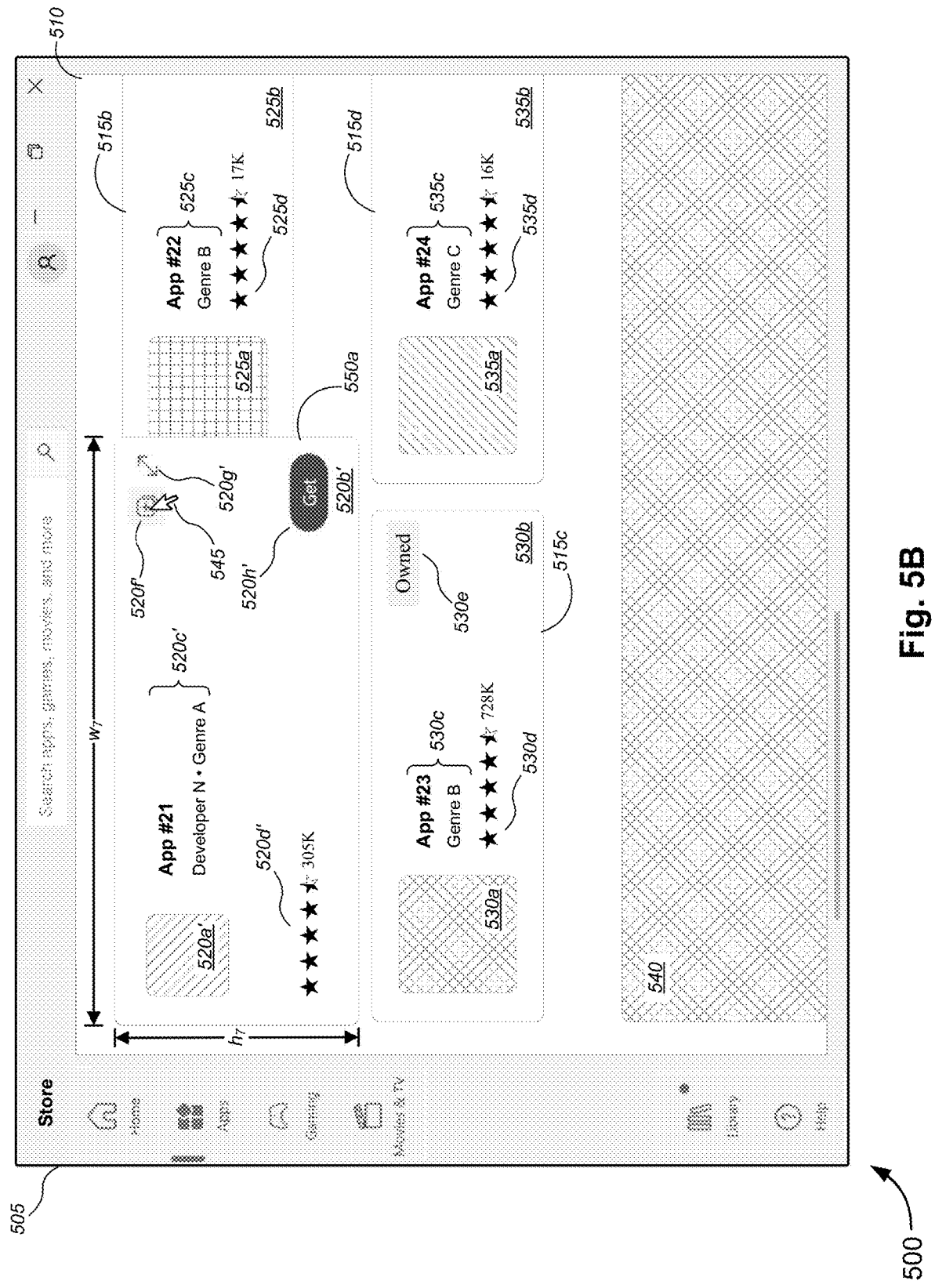

Further to the example UXs 200, 300, and 400 of FIGS. 2-4, multiple popup card functionalities may be applied to UXs for displaying, adding, and managing collections of apps. For instance, as shown in the example UX 500 of FIG. 5A, a plurality of apps may be represented by rest UI cards or rest UI elements 515a-515d (similar to rest UI cards 415a-415i of FIG. 4A), with rest UI sub-elements (e.g., rest UI sub-elements 520a-520e, 525a-525d, 530a-530e, and 535a-535d). The rest UI card 515 may have a height $h_6$ and a width $w_6$. When a user interacts with a rest UI card (e.g., rest UI card 515a), when a cursor (e.g., cursor 545) is determined to be positioned over the rest UI card, and/or when the rest UI card is determined to be highlighted or selected, popup card functionality may be triggered. When the popup card functionality has been triggered, a first popup card 550a may be generated, with at least one sub-element of the rest UI card (e.g., rest UI sub-elements 520a-520e, 525a-525d, 530a-530e, and 535a-535d) being mapped to corresponding at least one sub-element of the first popup card (e.g., popup UI sub-elements 520a'-520d' and 520f'-520h'). The first popup card 550a is then caused to be displayed (in some cases, overlaid over at least a portion of the rest UI card 515a), as shown in FIG. 5B. In examples, the first popup card 550a has a height $h_7$ and a width $w_7$ that is different from the height $h_6$ and the width $w_6$ of the rest UI card 515a. In some examples, the first popup card 550a may include sub-elements 520' for adding app collections 520f, for expanding the popup card (or creating a new popup card) 520g', and getting 520h' (e.g., buying, renting, downloading, or installing) the app represented by the rest UI card 515a or the first popup card 550a.

Figure 5C:
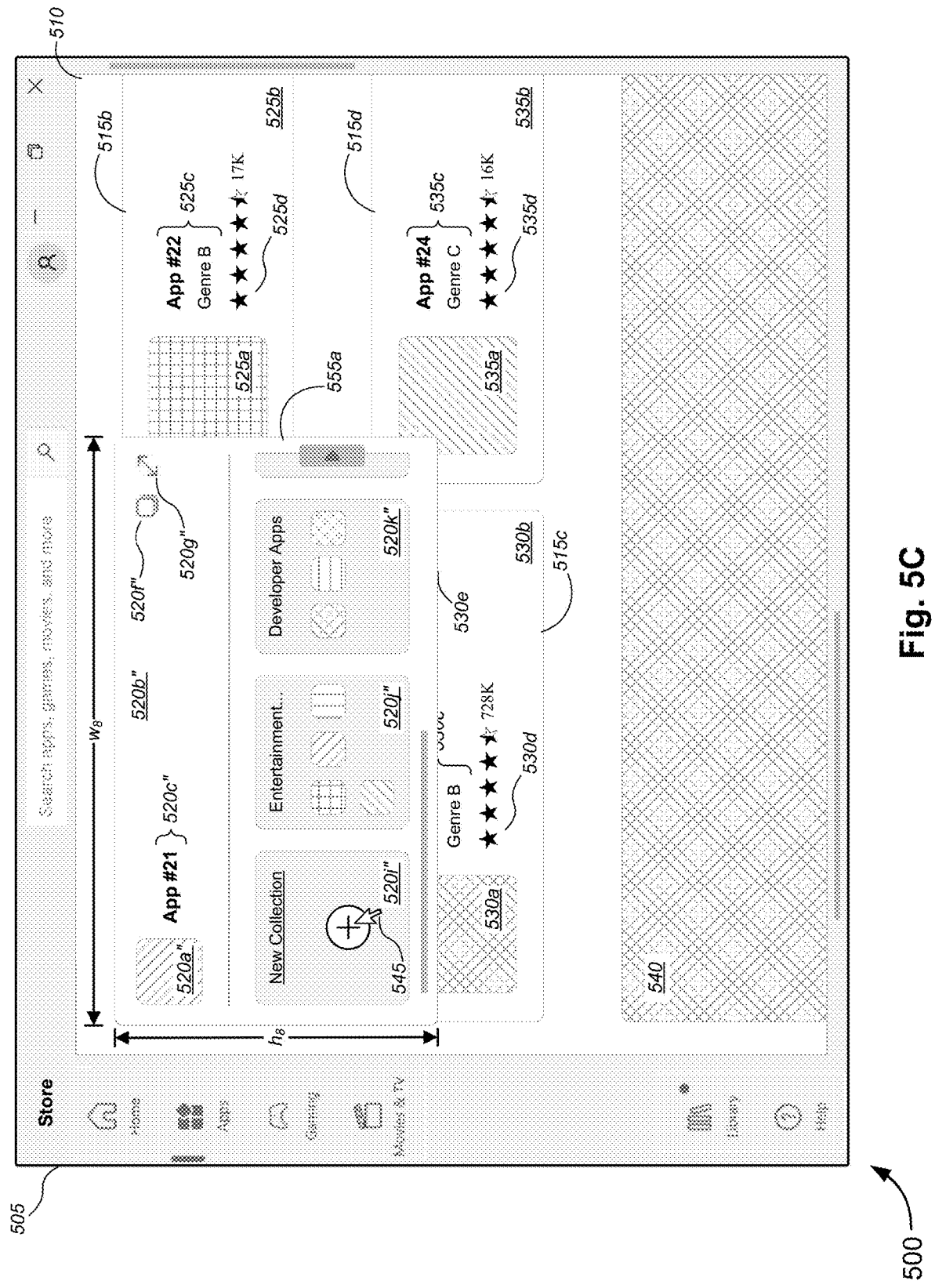
Figure 5D:
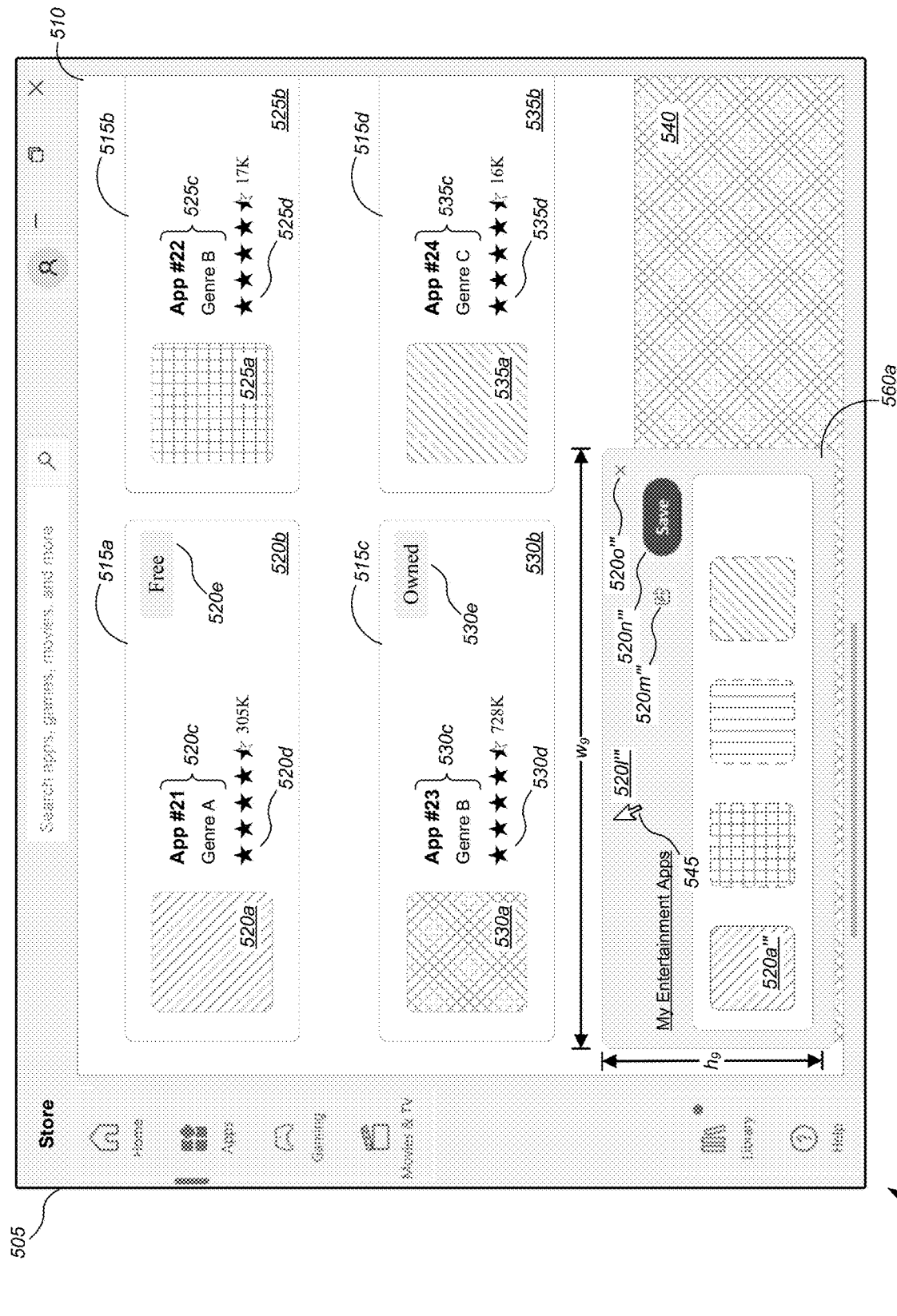
Figure 5E:
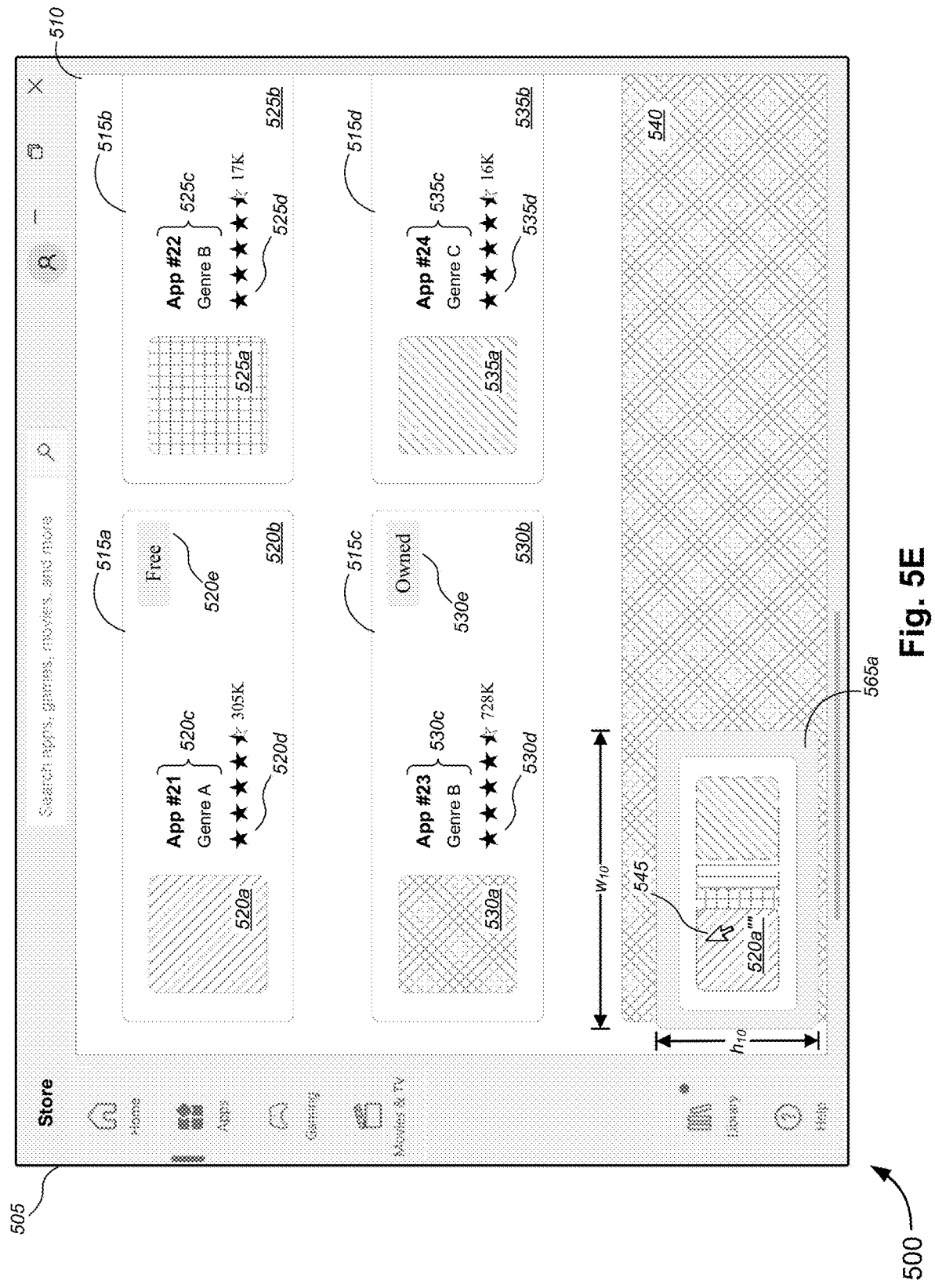
Figure 5F:
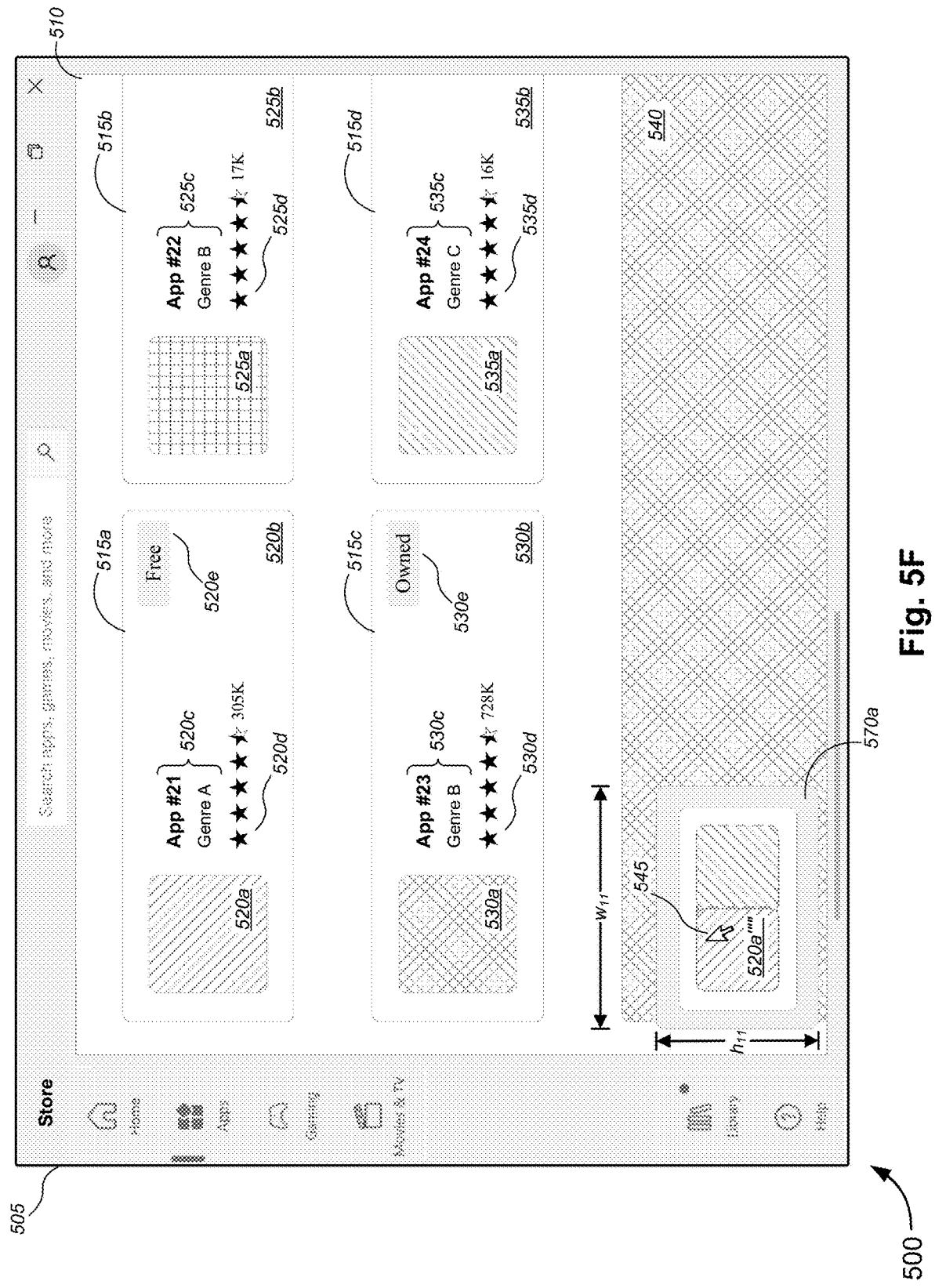

When either the add app collections icon 520f or expand popup card icon 520g' is actuated or clicked, a second popup card 555a is generated, with at least one sub-element of the rest UI card (e.g., rest UI sub-elements 520a-520e, 525a-525d, 530a-530e, and 535a-535d) or at least one sub-element of the first popup card (e.g., popup UI sub-elements 520a'-520d' and 520f'-520h') being mapped to corresponding at least one sub-element of the second popup card (e.g., popup UI sub-elements 520a"-520c", 520f", 520a", and 520a"-520k"). The second popup card 555a is then caused to be displayed (in some cases, overlaid over at least a portion of the rest UI card 515a), as shown in FIG. 5C. In examples, the second popup card 555a has a height $h_8$ and a width $w_8$ that is different from the height $h_6$ and the width $w_6$ of the rest UI card 515a and different from the height $h_7$ and the width $w_7$ of the first popup card 550a. In some examples, the second popup card 555a may include sub-elements 520i"-520k" for displaying, accessing, adding, or managing app collections.

When a sub-element 520" for displaying, accessing, adding, or managing app collections (in this case, sub-element 520i" or 520j") is actuated or clicked, a third popup card 560a is generated, with at least one sub-element of the rest UI card (e.g., rest UI sub-elements 520a-520e, 525a-525d, 530a-530e, and 535a-535d), at least one sub-element of the first popup card (e.g., popup UI sub-elements 520a'-520d' and 520f'-520h'), or at least one sub-element of the second popup card (e.g., popup UI sub-elements 520a"-520c", 520f", 520g", and 520i"-520k") being mapped to corresponding at least one sub-element of the third popup card (e.g., popup UI sub-elements 520a'" and 520l'"-520o'"). The third popup card 560a is then caused to be displayed (in some cases, not overlaid over any portion of the rest UI card 515a), as shown in FIG. 5D. In examples, the third popup card 555a has a height $h_9$ and a width $w_9$ that is different from at least one of the height $h_6$ and the width $w_6$ of the rest UI card 515a, the height $h_7$ and the width $w_7$ of the first popup card 550a, and/or the height $h_8$ and the width $w_8$ of the second popup card 555a. In some examples, the third popup card 560a may include sub-elements including a share app collection icon or button 520m'", a save icon or button 520n'", and a close popup card icon or button 520O'" for displaying, accessing, adding, or managing app collections. In FIG. 5D, the dash-lined border around app image icons denote apps that have not yet been added but are suggested by the system to be added to the app collection.

When the user interacts with other portions of the UI 505 or the app window 510, the third popup card 560a collapses into a different, smaller form 570a, having a height $h_{11}$ and a width $w_{11}$ that is different from the height $h_9$ and the width $w_9$ of the third popup card 560a, as shown in FIG. 5F. In some cases, transitioning is performed between the two states 560a and 570a, as shown in FIG. 5E, where the intermediate state 565a has a transitioning height $h_{10}$ and width $w_{10}$ that is different from the height $h_9$ and the width $w_9$ of the third popup card 560a. While transitioning, the app image icons, particularly the app image icons of the suggested apps, may be collapsed into or under other app image icons, as shown from FIGS. 5D-5F. Alternatively, instead of the third popup card 560a morphing from state 560a to state 565a to state 570a, separate popup cards (e.g., fourth popup card 565a and/or fifth popup card 570a) may be generated and displayed, with at least one sub-element (e.g., sub-element 520a, 520a', 520a", and/or 520a''') being mapped to at least one sub-element of the fourth popup card (e.g., sub-element 520a'''') and/or at least one sub-element of the fifth popup card (e.g., sub-element 520a'''''). At least one sub-element (e.g., sub-element 520a''', 520a'''', and/or 520a''''') may be animated during display of the fourth popup card 565a and/or fifth popup card 570a. The generation, mapping, display, and animation are as described above with respect to UXs 200, 300, and 400. FIGS. 5A-5F also depicts popup cards adapting to different surfaces within the UI 505 or the app window 510, as the popup cards transition from one state (or card) to another.

Although the example UIs 205, 305, 405, and 505 of FIGS. 2A-5F are depicted as digital marketplace UIs, the various embodiments are not so limited, and the UIs may be embodied as any suitable UIs including, but not limited to, app UIs, web portal UIs, digital marketplace UIs, digital media content UI, display screen UIs, or touchscreen UIs.

Figure 6A:
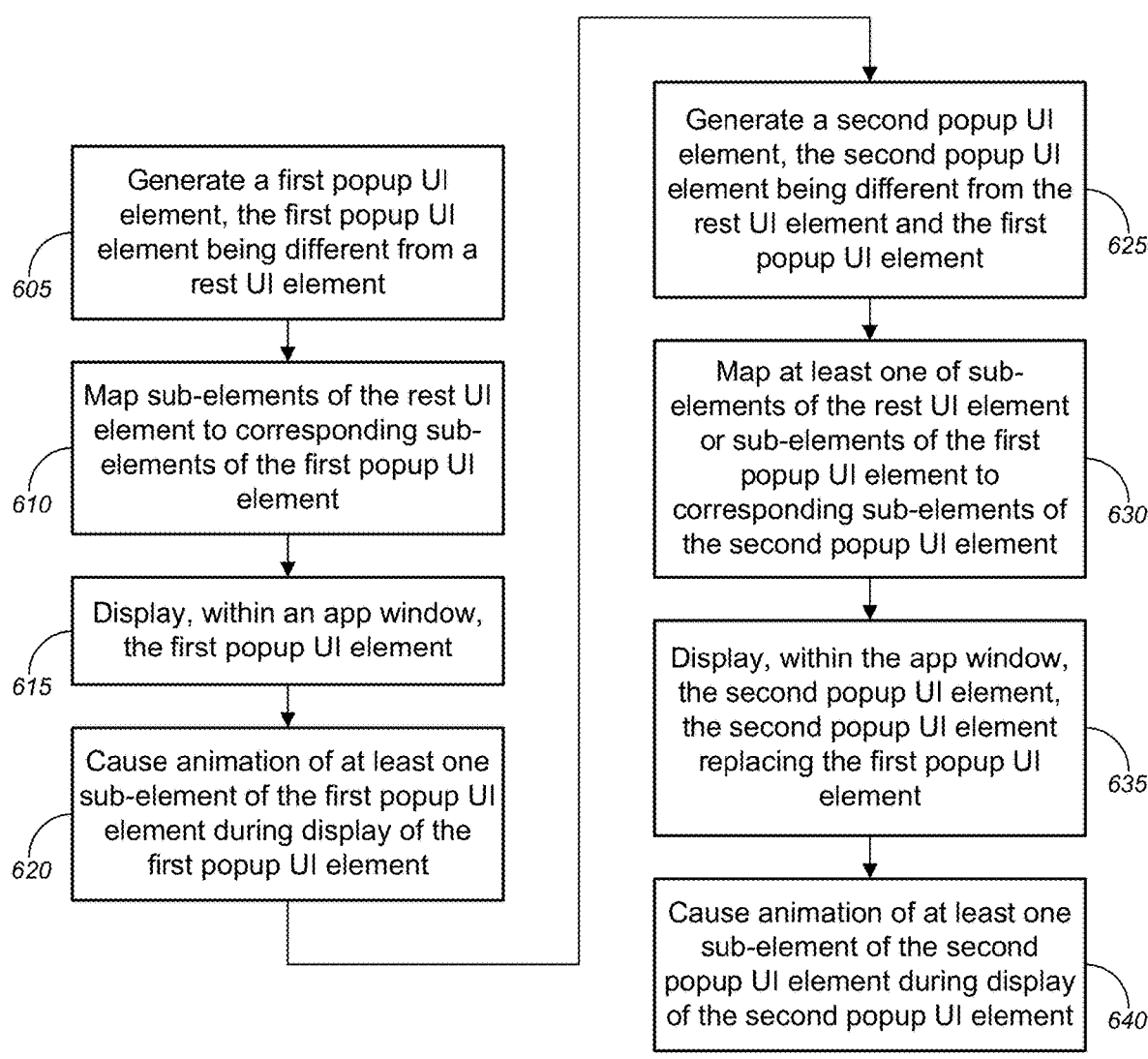
FIGS. 6A-6C depict an example method for implementing a customizable and animatable popup card system.
Figure 6B:
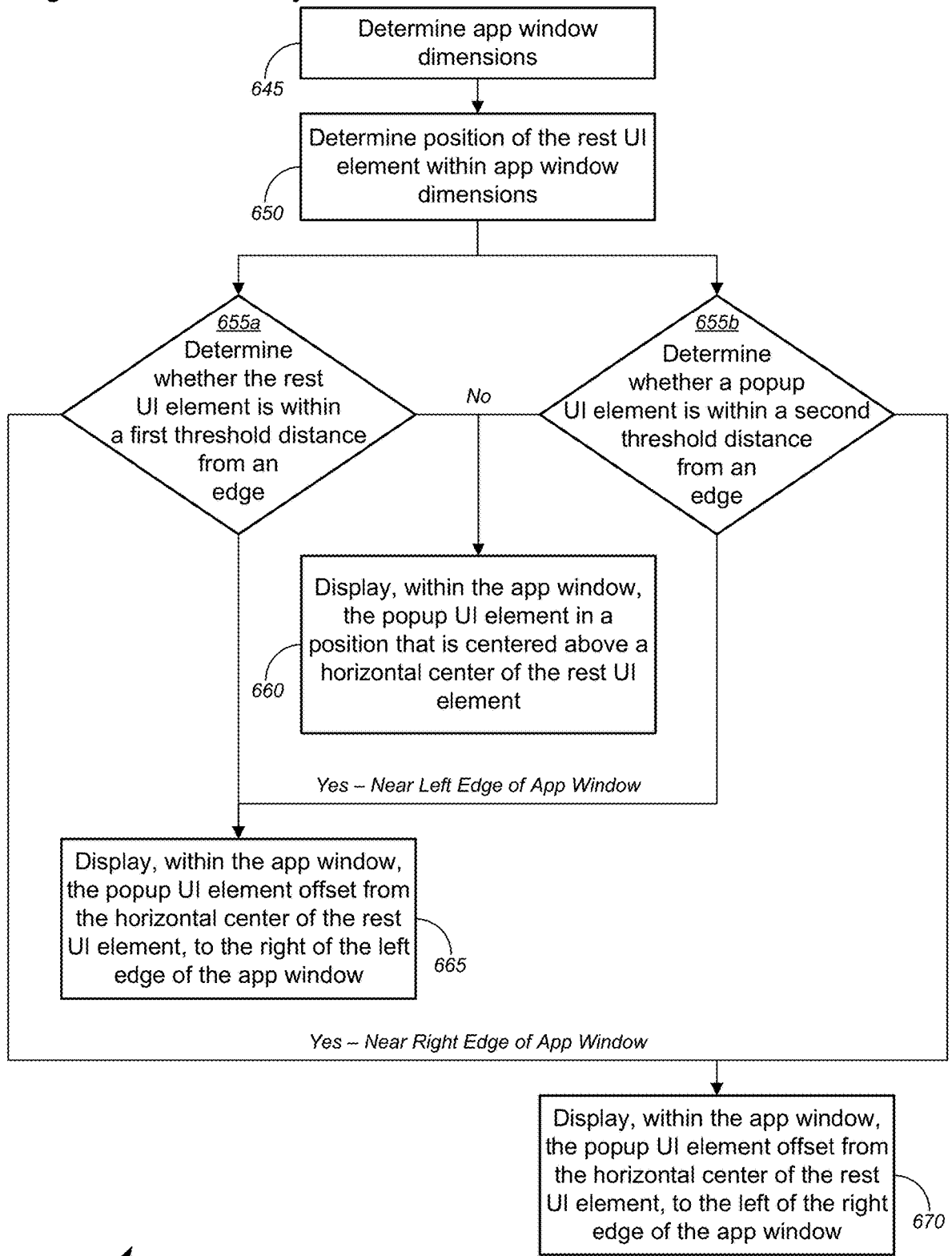
Figure 6C:
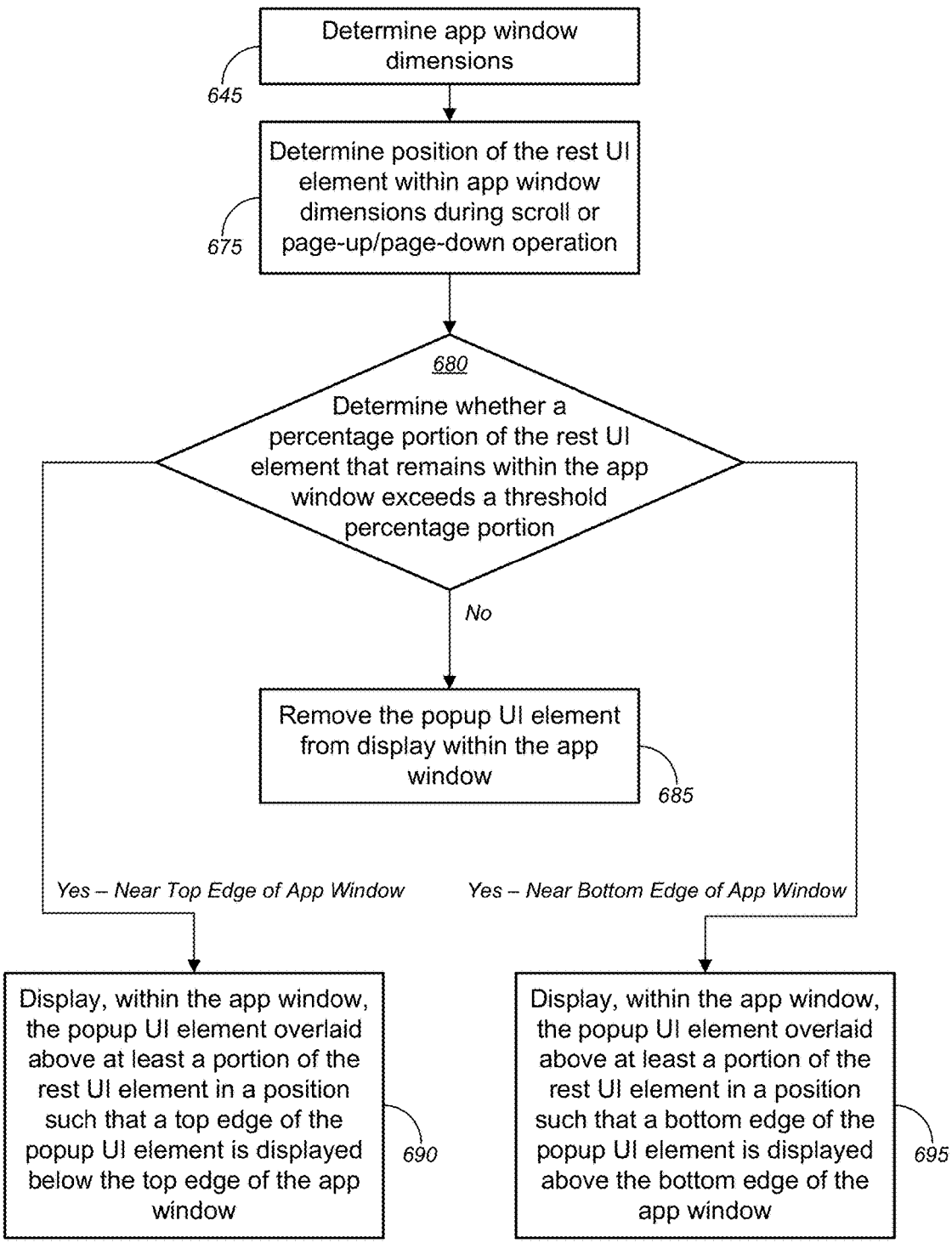

FIGS. 6A-6C depict an example method 600 for implementing a customizable and animatable popup card system. The operations of method 600 may be performed by one or more computing devices, such as the devices discussed in the various systems above. In some examples, the operations of method 600 are performed by the computing device operating as the computing system. Operations 605-620 and 645-695 of FIGS. 6A-6C may be performed automatically either (1) in response to receiving first user input corresponding to interaction with a rest UI element that is displayed within an app window that is displayed within a display screen of a user device and/or (2) when a cursor is above a portion of the rest UI element or when the rest UI element is being highlighted or selected. Operations 625-695 of FIGS. 6A-6C may be performed automatically either (3) in response to receiving second user input corresponding to interaction with the first popup UI element that is displayed within the app window and/or (4) when the cursor is above a portion of the first popup UI element or when the first popup UI element is being highlighted or selected.

At operation 605, a first popup UI element is generated, the first popup UI element being different from the rest UI element. At operation 610, sub-elements of the rest UI element are mapped to corresponding sub-elements of the first popup UI element. The first popup UI element is displayed, within the app window, at operation 615. In some cases, the first popup UI element may be displayed overlaid above at least a portion of the rest UI element (such as shown, e.g., in FIG. 2B-2D, 3A, 3B, 4B, 4C, 5B, or 5C). In other cases, the first popup UI element may be displayed in other portions of the app window while not being displayed overlaid above a portion of the rest UI element (such as shown, e.g., in FIGS. 5D-5F). At operation 620, at least one sub-element of the first popup UI element may be caused to be animated during display of the first popup UI element based on the mapping of the sub-elements in operation 610.

According to some embodiments, the customizable and animatable popup card system may be implemented with edge awareness functionalities within app windows, such as shown in and described above with respect to FIGS. 2A-2D and as shown and described below with respect to FIG. 6B. For example, displaying the first popup UI element (at operation 615) may include determining app window dimensions (at operation 645 in FIG. 6B), such as by receiving, accessing, or otherwise obtaining app window dimensions from the user device displaying the app window within the UI. At operation 650, the system may determine a position of the rest UI element within the app window dimensions. At operation 655a, the system may determine whether coordinates of the rest UI element as displayed within the app window indicate that the rest UI element lies beyond or within a first threshold distance from an edge of the app window (e.g., left or right edge for an app window with only up/down scrolling; top or bottom edge for an app window with only left/right scrolling; or left, right, top, or bottom for an app window with both up/down and left/right scrolling). Alternatively, at operation 655b, the system may determine whether coordinates of a to-be-generated popup UI element would indicate that the to-be-generated popup UI element would lie beyond or within a second threshold distance from an edge of the app window.

Based on a determination that either the rest UI element lies beyond the first threshold distance from an edge or the to-be-generated popup UI element would lie beyond the second threshold distance from an edge, at operation 660, the popup UI element (e.g., a first, second, or subsequent popup UI element) may be displayed, within the app window, in a position that is centered above a horizontal center of the rest UI element between a left edge and a right edge of the rest UI element (as shown, e.g., in FIG. 2B). Alternatively, based on a determination that the rest UI element lies within the first threshold distance from a left edge or the to-be-generated popup UI element would lie within the second threshold distance from the left edge, at operation 665, the popup UI element may be displayed, within the app window, in a position that is offset from the horizontal center of the rest UI element such that a left edge of the popup UI element is displayed to the right of the left edge of the app window (as shown, e.g., in FIG. 2D). Alternatively, based on a determination that the rest UI element lies within the first threshold distance from a right edge or the to-be-generated popup UI element would lie within the second threshold distance from the right edge, at operation 670, the popup UI element may be displayed, within the app window, in a position that is offset from the horizontal center of the rest UI element such that a right edge of the popup UI element is displayed to the left of the right edge of the app window (as shown, e.g., in FIG. 2C). In some examples, in one or more of the above cases, the first popup UI element may be displayed overlaid above at least a portion of the rest UI element.

In some embodiments, the customizable and animatable popup card system may be implemented with scrolling awareness functionalities within app windows, such as shown in and described above with respect to FIGS. 3A-3C and as shown and described below with respect to FIG. 6C. Scrolling awareness functionalities are triggered, or may otherwise activate passively or reactively, when a cursor is above a portion of the rest UI element or when the rest UI element is being highlighted or selected. For example, displaying the first popup UI element (at operation 615) may include determining app window dimensions (at operation 645 in FIG. 6C), similar to the process at operation 645 in FIG. 6B. At operation 675, the system may determine a position of the rest UI element within the app window dimensions during scroll or page-up/page-down operation. At operation 680, the system may determine whether a percentage portion of the rest UI element that remains within the app window exceeds a threshold percentage portion.

Based on a determination that a percentage portion of the rest UI element that remains within the app window does not exceed the threshold percentage portion or has fallen below the threshold percentage portion, at operation 685, the popup UI element may be removed from display within the app window. In some examples, the popup UI element (and its sub-elements) may be caused to be animated to transition between a first state and a second state. In some instances, the first state and the corresponding second state may include one of the following: (a) a full height and a zero height; (b) a full width and a zero width; (c) a full area and a zero area; (d) a full opaque display and a full transparent display; or (e) a fully visible display and a fully hidden display. Alternatively, based on a determination that a percentage portion of the rest UI element that remains within the app window does not exceed the threshold percentage portion or has fallen below the threshold percentage portion and a determination that a popup UI element is not currently being displayed, popup UI elements corresponding to the rest UI element may be prevented from being displayed within the app window.

Based on a determination that a percentage portion of the rest UI element that remains within the app window exceeds the threshold percentage portion and for a rest UI element near a top edge of the app window, at operation 690, the popup UI element may be displayed, within the app window, in a position such that a top edge of the popup UI element is displayed below the top edge of the app window (as shown, e.g., in FIGS. 3B and 3C). In a similar manner, based on a determination that a percentage portion of the rest UI element that remains within the app window exceeds the threshold percentage portion and for a rest UI element near a bottom edge of the app window, at operation 695, the popup UI element may be displayed, within the app window, in a position such that a bottom edge of the popup UI element is displayed above the bottom edge of the app window. In some examples, in one or more of the above cases, the first popup UI element may be displayed overlaid above at least a portion of the rest UI element. In some examples, the percentage portion and the corresponding threshold percentage portion may include one of (A) a percentage of an area of the rest UI element that remains within the app window and a corresponding threshold percentage area; or (B) a percentage of a height of the rest UI element that remains within the app window and a corresponding threshold percentage height.

In some examples, turning back to FIG. 6A, displaying the first popup UI element (at operation 615) and/or causing animation of the at least one sub-element of the first popup UI element (at operation 620) may include causing animation of the first popup UI element (and its sub-elements) to transition from the second state to the first state, rather than from the first state to the second state as described above. In examples, displaying the first popup UI element (at operation 615) and/or causing animation of the at least one sub-element of the first popup UI element (at operation 620) may include displaying the first popup UI element between a third state to a fourth state. In some instances, the first popup UI element in the third state has an initial size that is the same size as the rest UI element. In some cases, the first popup UI element in the fourth state has a final size that is different from the size of the rest UI element. Displaying the first popup UI element between the third state and the fourth state may be performed in a smooth transition by displaying the first popup UI element by progressively changing the size of the first popup UI element between its initial size and its final size. In some examples, causing animation of the at least one sub-element of the first popup UI element during display of the first popup UI element may include displaying intermediate animations of the at least one sub-element as the first popup UI element is being smoothly transitioned between the third state and the fourth state.

In some embodiments, as shown in FIG. 6A, method 600 may further include generating a second popup UI element, the second popup UI element being different from the rest UI element and the first popup UI element (at operation 625). At operation 630, at least one of sub-elements of the rest UI element or sub-elements of the first popup UI element may be mapped to corresponding sub-elements of the second popup UI element. At operation 635, the second popup UI element may be displayed, within the app window, the second popup UI element replacing the first popup UI element. In some cases, the second popup UI element may be displayed overlaid above at least a portion of the rest UI element. At operation 640, at least one sub-element of the second popup UI element may be caused to be animated during display of the second popup UI element. According to some embodiments, displaying the second popup UI element may include displaying the second popup UI element between a fifth state to a sixth state. In some cases, the second popup UI element in the fifth state has an initial size that is the same size as the first popup UI element. In some instances, the second popup UI element in the sixth state has a final size that is different from the size of the rest UI element and the size of the first popup UI element. Displaying the second popup UI element between the fifth state and the sixth state may be performed in a smooth transition by displaying the second popup UI element by progressively changing the size of the second popup UI element between its initial size and its final size.

In some embodiments, the first and second user input may each include one of moving a cursor displayed in the app window to hover over a portion of the rest UI element, single clicking or single tapping a portion of the rest UI element, long pressing a portion of the rest UI element, double clicking or double tapping while the cursor is over a portion of the rest UI element, scrolling up or down within the app window, paging up or down within the app window, tabbing between UI elements displayed within the app window, pinching a portion of the rest UI element, swiping a portion of the rest UI element, or voice input.

In some examples, animation of a sub-element among the at least one sub-element as displayed within the app window (at operation 620 or 640) may include at least one of changing positional offset parameters of the sub-element within the app window, changing a level of opacity of the sub-element, changing one or more colors of the sub-element, selectively enabling or disabling rendering of at least portions of the sub-element, changing a size or scale of the sub-element, changing a shape of the sub-element, changing shadow effects of the sub-element, revealing additional sub-elements, hiding the sub-element, playing a video clip within the sub-element, or replacing the sub-element with a media playback UI sub-element.

While the techniques and procedures in method 600 are depicted and/or described in a certain order for purposes of illustration, it should be appreciated that certain procedures may be reordered and/or omitted within the scope of various embodiments. Moreover, while the method 600 may be implemented by or with (and, in some cases, are described below with respect to) the systems, examples, or embodiments 100, 200, 300, 400, and 500 of FIGS. 1, 2A-2D, 3A-3C, 4A-4C, and 5A-5F, respectively (or components thereof), such methods may also be implemented using any suitable hardware (or software) implementation. Similarly, while each of the systems, examples, or embodiments 100, 200, 300, 400, and 500 of FIGS. 1, 2A-2D, 3A-3C, 4A-4C, and 5A-5F, respectively (or components thereof), can operate according to the method 600 (e.g., by executing instructions embodied on a computer readable medium), the systems, examples, or embodiments 100, 200, 300, 400, and 500 of FIGS. 1, 2A-2D, 3A-3C, 4A-4C, and 5A-5F can each also operate according to other modes of operation and/or perform other suitable procedures.

Figure 7:
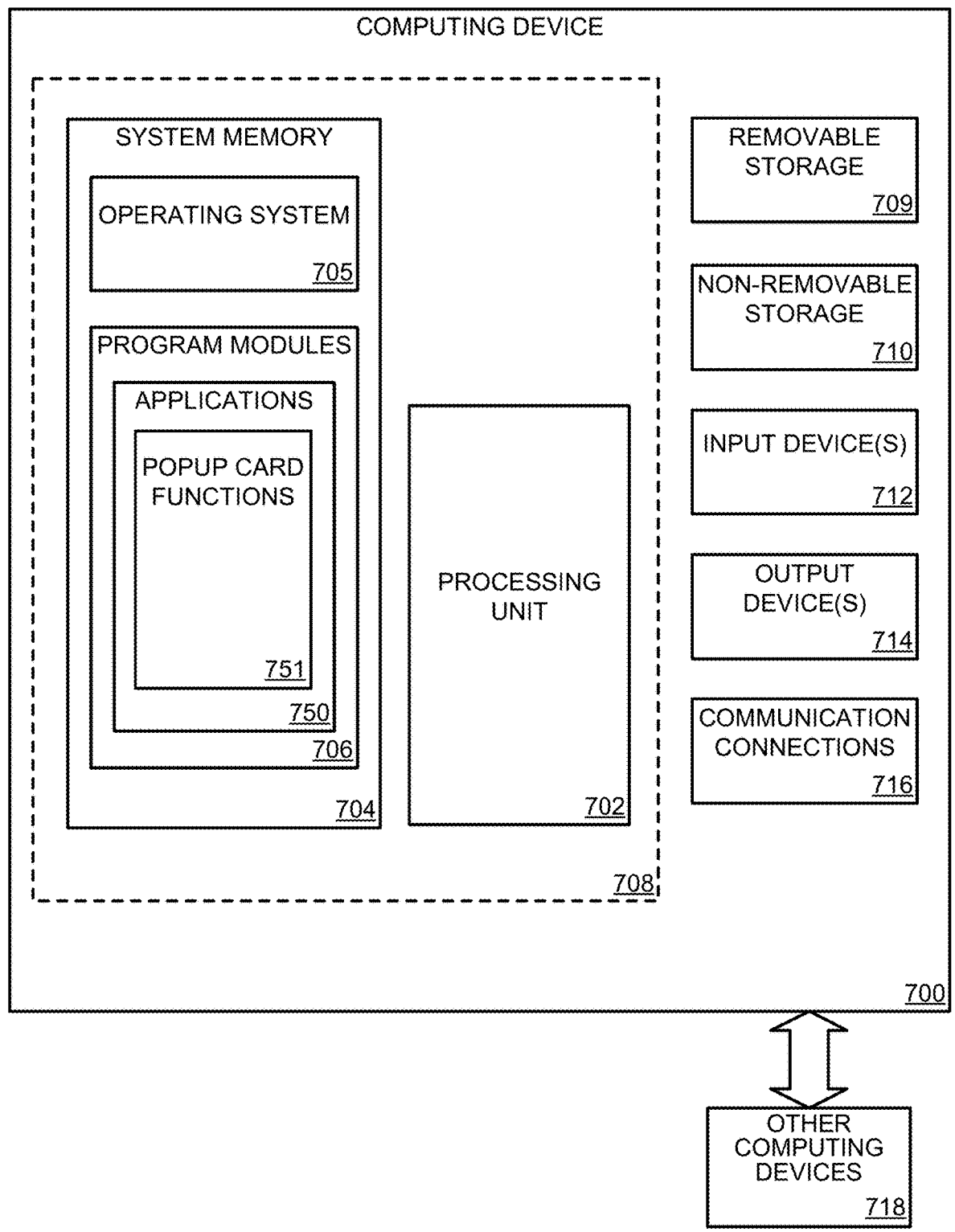
FIG. 7 depicts a block diagram illustrating example physical components of a computing device with which aspects of the technology may be practiced.

FIG. 7 depicts a block diagram illustrating physical components (i.e., hardware) of a computing device 700 with which examples of the present disclosure may be practiced. The computing device components described below may be suitable for a client device implementing the customizable and animatable popup card system, as discussed above. In a basic configuration, the computing device 700 may include at least one processing unit 702 and a system memory 704. The processing unit(s) (e.g., processors) may be referred to as a processing system. Depending on the configuration and type of computing device, the system memory 704 may include, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 750, such as popup card functions 751, to implement one or more of the systems or methods described above.

The operating system 705, for example, may be suitable for controlling the operation of the computing device 700. Furthermore, aspects of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionalities. For example, the computing device 700 may also include additional data storage devices (which may be removable and/or non-removable), such as, for example, magnetic disks, optical disks, or tape, etc. Such additional storage is illustrated in FIG. 7 by a removable storage device(s) 709 and a non-removable storage device(s) 710.

As stated above, a number of program modules and data files may be stored in the system memory 704. While executing on the processing unit 702, the program modules 706 may perform processes including, but not limited to, one or more of the operations of the method(s) as illustrated in FIG. 6, or one or more operations of the system(s), apparatus(es), and/or example(s) as described with respect to FIGS. 1-5F, or the like. Other program modules that may be used in accordance with examples of the present invention may include applications such as electronic mail and contacts applications, word processing applications, spreadsheet applications, database applications, slide presentation applications, drawing or computer-aided application programs, etc.

Furthermore, examples of the invention may be practiced in an electrical circuit including discrete electronic elements, packaged or integrated electronic chips containing logic gates, a circuit utilizing a microprocessor, or on a single chip containing electronic elements or microprocessors. For example, examples of the invention may be practiced via a system-on-a-chip ("SOC") where each or many of the components illustrated in FIG. 7 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 700 on the single integrated circuit (or chip). Examples of the present disclosure may also be practiced using other technologies capable of performing logical operations such as, for example, AND, OR, and NOT, including, but not limited to, mechanical, optical, fluidic, and/or quantum technologies.

The computing device 700 may also have one or more input devices 712 such as a keyboard, a mouse, a pen, a sound input device, and/or a touch input device, etc. The output device(s) 714 such as a display, speakers, and/or a printer, etc. may also be included. The aforementioned devices are examples and others may be used. The computing device 700 may include one or more communication connections 716 allowing communications with other computing devices 718. Examples of suitable communication connections 716 include, but are not limited to, radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 704, the removable storage device 709, and the non-removable storage device 710 are all computer storage media examples (i.e., memory storage). Computer storage media may include RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, and not limitation, communication media may include wired media such as a wired network or direct-wired connection, and wireless media such as acoustic, RF, infrared, and other wireless media.

As should be appreciated from the foregoing, the present technology provides multiple technical benefits and solutions to technical problems. For instance, implementing UXs generally raises multiple technical problems. For instance, one technical problem includes animating sub-elements within a popup card or linking animations between corresponding sub-elements in different popup cards. Another technical problem includes a lack of location awareness of conventional popup cards, where popup cards may be clipped or truncated if near a side boundary. Yet another technical problem includes a lack of scrolling awareness of conventional popup cards, where popup cards may be anchored over its corresponding rest card and, when the rest card is scrolled above a top edge or below a bottom edge of the app window, either the popup card disappears with its rest card or the popup card remains pushed up against the top or bottom edge of the app window (blocking the underlying UI). Still another technical problem includes a lack of adaptiveness of conventional popup cards, where only a static or minimally animated popup card functionality is achievable in conventional UXs. Another technical problem includes interactions by users with conventional popup cards generally causing navigation to another page or app. The present technology provides a popup card system that includes animatable popup cards and popup card UI elements, with location awareness functionality and scrolling awareness functionality. The UX that is generated and displayed by the popup card system is adaptive to a multitude of scenarios and app (window) surfaces, and is responsive to a variety of user inputs (including via mouse, keyboard, pen/stylus, touch, and voice). Transitioning between popup card states and/or between corresponding popup cards is smooth and seamless, and is anchored within the UI or app window, without need for users to navigate to another page or app to complete an action triggered by user input.

In an aspect, the technology relates to a system for implementing a customizable and animatable popup card system. The system includes a processing system and memory storing computer executable instructions that, when executed by the processing system, cause the system to perform a set of operations. The set of operations includes, in response to receiving a first user input corresponding to an interaction with a rest UI element that is displayed within an app window, generating a first popup UI element, the first popup UI element being different from the rest UI element. The set of operations further includes mapping sub-elements of the rest UI element to corresponding sub-elements of the first popup UI element. The set of operations further includes displaying, within the app window, the first popup UI element overlaid above at least a portion of the rest UI element; and causing animation of at least one sub-element of the first popup UI element during display of the first popup UI element.

In examples, the first user input includes one of moving a cursor displayed in the app window to hover over a portion of the rest UI element, single clicking or single tapping a portion of the rest UI element, long pressing a portion of the rest UI element, double clicking or double tapping while the cursor is over a portion of the rest UI element, scrolling up or down within the app window, paging up or down within the app window, tabbing between UI elements displayed within the app window, pinching a portion of the rest UI element, swiping a portion of the rest UI element, or voice input. In some examples, the animation includes at least one of changing positional offset parameters of the sub-element within the app window, changing a level of opacity of the sub-element, changing one or more colors of the sub-element, selectively enabling or disabling rendering of at least portions of the sub-element, changing a size or scale of the sub-element, changing a shape of the sub-element, changing shadow effects of the sub-element, revealing additional sub-elements, hiding the sub-element, playing a video clip within the sub-element, or replacing the sub-element with a media playback UI sub-element.

In some examples, displaying the first popup UI element overlaid above the at least a portion of the rest UI element includes, based on a determination that coordinates of the rest UI element as displayed within the app window indicate that the rest UI element lies beyond a first threshold distance from an edge of the app window, displaying, within the app window, the first popup UI element overlaid above at least a portion of the rest UI element in a position that is centered above a horizontal center of the rest UI element between a left edge and a right edge of the rest UI element. Alternatively or additionally, displaying the first popup UI element overlaid above the at least a portion of the rest UI element includes, based on a determination that coordinates of the rest UI element as displayed within the app window indicate that the rest UI element lies within the first threshold distance from a left edge of the app window, displaying, within the app window, the first popup UI element overlaid above at least a portion of the rest UI element in a position that is offset from the horizontal center of the rest UI element such that a left edge of the first popup UI element is displayed to the right of the left edge of the app window. Alternatively or additionally, displaying the first popup UI element overlaid above the at least a portion of the rest UI element includes, based on a determination that coordinates of the rest UI element as displayed within the app window indicate that the rest UI element lies within the first threshold distance from a right edge of the app window, displaying, within the app window, the first popup UI element overlaid above at least a portion of the rest UI element in a position that is offset from the horizontal center of the rest UI element such that a right edge of the first popup UI element is displayed to the left of the right edge of the app window.

Alternatively or additionally, displaying the first popup UI element overlaid above the at least a portion of the rest UI element includes, based on a determination that coordinates of the rest UI element as displayed within the app window indicate that a portion of the rest UI element has moved above a top edge of the app window during a scroll-down operation or a page-down operation, and based on a determination that a percentage portion of the rest UI element that remains within the app window exceeds a threshold percentage portion, displaying, within the app window, the first popup UI element overlaid above at least a portion of the rest UI element in a position such that a top edge of the first popup UI element is displayed below the top edge of the app window. Alternatively or additionally, displaying the first popup UI element overlaid above the at least a portion of the rest UI element includes, based on a determination that coordinates of the rest UI element as displayed within the app window indicate that a portion of the rest UI element has moved below a bottom edge of the app window during a scroll-up operation or a page-up operation, and based on a determination that the percentage portion of the rest UI element that remains within the app window exceeds the threshold percentage portion, displaying, within the app window, the first popup UI element overlaid above at least a portion of the rest UI element in a position such that a bottom edge of the first popup UI element is displayed above the bottom edge of the app window.

In an example, the percentage portion and the corresponding threshold percentage portion include one of: a percentage of an area of the rest UI element that remains within the app window and a corresponding threshold percentage area; or a percentage of a height of the rest UI element that remains within the app window and a corresponding threshold percentage height. In some cases, the set of operations further includes, based on a determination that the first popup UI element is not currently being displayed and based on a determination that the percentage portion of the rest UI element that remains within the app window is less than the threshold percentage portion, preventing the first popup UI element from being displayed within the app window. Alternatively or additionally, in some cases, the set of operations further includes, based on a determination that the first popup UI element is currently being displayed and based on a determination that the percentage portion of the rest UI element that remains within the app window has fallen below the threshold percentage portion, causing animation of the first popup UI element to transition between a first state and a second state. In an example, the first state and the corresponding second state include one of a full height and a zero height; a full width and a zero width; a full area and a zero area; a full opaque display and a full transparent display; or a fully visible display and a fully hidden display.

In some examples, displaying the first popup UI element includes displaying the first popup UI element between a third state to a fourth state. In some cases, the first popup UI element in the third state has an initial size that is the same size as the rest UI element. In some examples, the first popup UI element in the fourth state has a final size that is different from the size of the rest UI element. In examples, displaying the first popup UI element between the third state and the fourth state is performed in a smooth transition by displaying the first popup UI element by progressively changing the size of the first popup UI element between its initial size and its final size. In some examples, causing animation of the at least one sub-element of the first popup UI element during display of the first popup UI element includes displaying intermediate animations of the at least one sub-element as the first popup UI element is being smoothly transitioned between the third state and the fourth state.

In some examples, in response to receiving a second user input corresponding to an interaction with the first popup UI element, the set of operations further includes generating a second popup UI element, the second popup UI element being different from the rest UI element and the first popup UI element. The set of operations further includes mapping at least one of sub-elements of the rest UI element or sub-elements of the first popup UI element to corresponding sub-elements of the second popup UI element. The set of operations further includes displaying, within the app window, the second popup UI element overlaid above at least a portion of the rest UI element, the second popup UI element replacing the first popup UI element. The set of operations further includes causing animation of at least one sub-element of the second popup UI element during display of the second popup UI element.

In examples, displaying the second popup UI element includes displaying the second popup UI element between a fifth state to a sixth state. In some examples, the second popup UI element in the fifth state has an initial size that is the same size as the first popup UI element. In examples, the second popup UI element in the sixth state has a final size that is different from the size of the rest UI element and the size of the first popup UI element. In some examples, displaying the second popup UI element between the fifth state and the sixth state is performed in a smooth transition by displaying the second popup UI element by progressively changing the size of the second popup UI element between its initial size and its final size.

In another aspect, the technology relates to a computer-implemented method for implementing a customizable and animatable popup card system. The method includes, in response to receiving a first user input corresponding to an interaction with a rest UI element that is displayed within an app window: generating a first popup UI element, the first popup UI element being different from the rest UI element; mapping sub-elements of the rest UI element to corresponding sub-elements of the first popup UI element; displaying, within an app window, the first popup UI element; and causing animation of at least one sub-element of the first popup UI element to transition from an initial state to a final state, during display of the first popup UI element. In examples, in the initial state, the at least one sub-element of the first popup UI element is similar or identical to a corresponding sub-element of the rest UI element.

In some examples, the animation includes at least one of changing positional offset parameters of the sub-element within the app window, changing a level of opacity of the sub-element, changing one or more colors of the sub-element, selectively enabling or disabling rendering of at least portions of the sub-element, changing a size or scale of the sub-element, changing shadow effects of the sub-element, revealing additional sub-elements, hiding the sub-element, playing a video clip within the sub-element, or replacing the sub-element with a media playback UI sub-element.

In examples, displaying the first popup UI element includes, based on a determination that coordinates of the rest UI element as displayed within the app window indicate that the rest UI element lies beyond a first threshold distance from an edge of the app window, displaying, within the app window, the first popup UI element overlaid above at least a portion of the rest UI element in a position that is centered above a horizontal center of the rest UI element between a left edge and a right edge of the rest UI element. Alternatively or additionally, displaying the first popup UI element includes, based on a determination that coordinates of the rest UI element as displayed within the app window indicate that the rest UI element lies within the first threshold distance from a left edge of the app window, displaying, within the app window, the first popup UI element overlaid above at least a portion of the rest UI element in a position that is offset from the horizontal center of the rest UI element such that a left edge of the first popup UI element is displayed to the right of the left edge of the app window. Alternatively or additionally, displaying the first popup UI element includes, based on a determination that coordinates of the rest UI element as displayed within the app window indicate that the rest UI element lies within the first threshold distance from a right edge of the app window, displaying, within the app window, the first popup UI element overlaid above at least a portion of the rest UI element in a position that is offset from the horizontal center of the rest UI element such that a right edge of the first popup UI element is displayed to the left of the right edge of the app window.

In some examples, displaying the first popup UI element includes, based on a determination that coordinates of the rest UI element as displayed within the app window indicate that a portion of the rest UI element has moved above a top edge of the app window during a scroll-down operation or a page-down operation, and based on a determination that a percentage portion of the rest UI element that remains within the app window exceeds a threshold percentage portion, displaying, within the app window, the first popup UI element overlaid above at least a portion of the rest UI element in a position such that a top edge of the first popup UI element is displayed below the top edge of the app window. Alternatively or additionally, displaying the first popup UI element includes, based on a determination that coordinates of the rest UI element as displayed within the app window indicate that a portion of the rest UI element has moved below a bottom edge of the app window during a scroll-up operation or a page-up operation, and based on a determination that the percentage portion of the rest UI element that remains within the app window exceeds the threshold percentage portion, displaying, within the app window, the first popup UI element overlaid above at least a portion of the rest UI element in a position such that a bottom edge of the first popup UI element is displayed above the bottom edge of the app window.

In examples, the percentage portion and the corresponding threshold percentage portion include one of: a percentage of an area of the rest UI element that remains within the app window and a corresponding threshold percentage area; or a percentage of a height of the rest UI element that remains within the app window and a corresponding threshold percentage height. In some examples, the computer-implemented method further includes, based on a determination that the first popup UI element is not currently being displayed and based on a determination that the percentage portion of the rest UI element that remains within the app window is less than the threshold percentage portion, preventing the first popup UI element from being displayed within the app window. Alternatively or additionally, the computer-implemented method further includes, based on a determination that the first popup UI element is currently being displayed and based on a determination that the percentage portion of the rest UI element that remains within the app window has fallen below the threshold percentage portion, causing animation of the first popup UI element to transition between a first state and a second state. In examples, the first state and the corresponding second state include one of: a full height and a zero height; a full width and a zero width; a full area and a zero area; a full opaque display and a full transparent display; or a fully visible display and a fully hidden display.

In some examples, the computer-implemented method further includes, in response to receiving a second user input corresponding to an interaction with the first popup UI element: generating a second popup UI element, the second popup UI element being different from the rest UI element and the first popup UI element; mapping at least one of sub-elements of the rest UI element or sub-elements of the first popup UI element to corresponding sub-elements of the second popup UI element; displaying, within the app window, the second popup UI element, the second popup UI element replacing the first popup UI element; and causing animation of at least one sub-element of the second popup UI element during display of the second popup UI element.

In yet another aspect, the technology relates to a system, including a processing system; and memory coupled to the processing system. The memory includes computer executable instructions that, when executed by the processing system, causes the system to perform operations. The operations include, when a cursor is above a portion of a rest UI element or when the rest UI element is being highlighted or selected and based on a determination to generate and display a popup UI element, automatically performing one or more tasks. The one or more tasks include generating a first popup UI element, the first popup UI element being different from the rest UI element; mapping sub-elements of the rest UI element to corresponding sub-elements of the first popup UI element; displaying, within an app window, the first popup UI element. In some examples, the first popup UI element is displayed between a first state to a second state in a smooth transition by progressively changing the size of the first popup UI element between its initial size in the first state and its final size in the second state. In examples, the initial size of the first popup UI in the first state is the same size as the rest UI element, while the final size of the first popup UI in the second state is different from the size of the rest UI element. The one or more tasks further include causing animation of at least one sub-element of the first popup UI element during display of the first popup UI element. In an example, causing animation of the at least one sub-element of the first popup UI element during display of the first popup UI element includes displaying intermediate animations of the at least one sub-element as the first popup UI element is being smoothly transitioned between the first state and the second state.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system for implementing a customizable and animatable popup card system, the system comprising:
   a processing system; and
   memory storing computer executable instructions that, when executed by the processing system, cause the system to perform operations comprising:
      in response to receiving a first user input corresponding to an interaction with a rest user interface ("UI") element that is displayed within a software application ("app") window:
         generating a first popup UI element, the first popup UI element being different from the rest UI element;
         mapping sub-elements of the rest UI element to corresponding sub-elements of the first popup UI element;
         displaying, within the app window, the first popup UI element overlaid above at least a portion of the rest UI element; and
         causing animation of at least one sub-element of the first popup UI element during display of the first popup UI element,
      wherein displaying the first popup UI element overlaid above the at least a portion of the rest UI element comprises at least one of:
         based on a determination that coordinates of the rest UI element as displayed within the app window indicate that the rest UI element lies beyond a first threshold distance from an edge of the app window, displaying, within the app window, the first popup UI element overlaid above at least a portion of the rest UI element in a position that is centered above a horizontal center of the rest UI element between a left edge and a right edge of the rest UI element;
         based on a determination that coordinates of the rest UI element as displayed within the app window indicate that the rest UI element lies within the first threshold distance from a left edge of the app window, displaying, within the app window, the first popup UI element overlaid above at least a portion of the rest UI element in a position that is offset from the horizontal center of the rest UI element such that a left edge of the first popup UI element is displayed to the right of the left edge of the app window; or
         based on a determination that coordinates of the rest UI element as displayed within the app window indicate that the rest UI element lies within the first threshold distance from a right edge of the app window, displaying, within the app window, the first popup UI element overlaid above at least a portion of the rest UI element in a position that is offset from the horizontal center of the rest UI element such that a right edge of the first popup UI element is displayed to the left of the right edge of the app window.

2. The system of claim 1, wherein the first user input comprises one of moving a cursor displayed in the app window to hover over a portion of the rest UI element, single clicking or single tapping a portion of the rest UI element, long pressing a portion of the rest UI element, double clicking or double tapping while the cursor is over a portion of the rest UI element, scrolling up or down within the app window, paging up or down within the app window, tabbing between UI elements displayed within the app window, pinching a portion of the rest UI element, swiping a portion of the rest UI element, or voice input.

3. The system of claim 1, wherein the animation comprises at least one of changing positional offset parameters of the sub-element within the app window, changing a level of opacity of the sub-element, changing one or more colors of the sub-element, selectively enabling or disabling rendering of at least portions of the sub-element, changing a size or scale of the sub-element, changing a shape of the sub-element, changing shadow effects of the sub-element, revealing additional sub-elements, hiding the sub-element, playing a video clip within the sub-element, or replacing the sub-element with a media playback UI sub-element.

4. The system of claim 1, wherein displaying the first popup UI element overlaid above the at least a portion of the rest UI element comprises at least one of:
   based on a determination that coordinates of the rest UI element as displayed within the app window indicate that a portion of the rest UI element has moved above a top edge of the app window during a scroll-down operation or a page-down operation, and based on a determination that a percentage portion of the rest UI element that remains within the app window exceeds a threshold percentage portion, displaying, within the app window, the first popup UI element overlaid above at least a portion of the rest UI element in a position such that a top edge of the first popup UI element is displayed below the top edge of the app window; or based on a determination that coordinates of the rest UI element as displayed within the app window indicate that a portion of the rest UI element has moved below a bottom edge of the app window during a scroll-up operation or a page-up operation, and based on a determination that the percentage portion of the rest UI element that remains within the app window exceeds the threshold percentage portion, displaying, within the app window, the first popup UI element overlaid above at least a portion of the rest UI element in a position such that a bottom edge of the first popup UI element is displayed above the bottom edge of the app window.

5. The system of claim 4, wherein the percentage portion and the corresponding threshold percentage portion comprise one of:
a percentage of an area of the rest UI element that remains within the app window and a corresponding threshold percentage area; or
a percentage of a height of the rest UI element that remains within the app window and a corresponding threshold percentage height.

6. The system of claim 4, wherein the set of operations further comprises at least one of:
based on a determination that the first popup UI element is not currently being displayed and based on a determination that the percentage portion of the rest UI element that remains within the app window is less than the threshold percentage portion, preventing the first popup UI element from being displayed within the app window; or
based on a determination that the first popup UI element is currently being displayed and based on a determination that the percentage portion of the rest UI element that remains within the app window has fallen below the threshold percentage portion, causing animation of the first popup UI element to transition between a first state and a second state, wherein the first state and the corresponding second state comprise one of:
a full height and a zero height;
a full width and a zero width;
a full area and a zero area;
a full opaque display and a full transparent display; or
a fully visible display and a fully hidden display.

7. The system of claim 6, wherein displaying the first popup UI element comprises:
displaying the first popup UI element between a third state to a fourth state, wherein the first popup UI element in the third state has an initial size that is the same size as the rest UI element, wherein the first popup UI element in the fourth state has a final size that is different from the size of the rest UI element, and wherein displaying the first popup UI element between the third state and the fourth state is performed in a smooth transition by displaying the first popup UI element by progressively changing the size of the first popup UI element between its initial size and its final size.

8. The system of claim 7, wherein causing animation of the at least one sub-element of the first popup UI element during display of the first popup UI element comprises displaying intermediate animations of the at least one sub-element as the first popup UI element is being smoothly transitioned between the third state and the fourth state.

9. The system of claim 1, wherein the operations further comprises:
in response to receiving a second user input corresponding to an interaction with the first popup UI element:
generating a second popup UI element, the second popup UI element being different from the rest UI element and the first popup UI element;
mapping at least one of sub-elements of the rest UI element or sub-elements of the first popup UI element to corresponding sub-elements of the second popup UI element;
displaying, within the app window, the second popup UI element overlaid above at least a portion of the rest UI element, the second popup UI element replacing the first popup UI element; and
causing animation of at least one sub-element of the second popup UI element during display of the second popup UI element.

10. The system of claim 9, wherein displaying the second popup UI element comprises:
displaying the second popup UI element between a fifth state to a sixth state, wherein the second popup UI element in the fifth state has an initial size that is the same size as the first popup UI element, wherein the second popup UI element in the sixth state has a final size that is different from the size of the rest UI element and the size of the first popup UI element, and wherein displaying the second popup UI element between the fifth state and the sixth state is performed in a smooth transition by displaying the second popup UI element by progressively changing the size of the second popup UI element between its initial size and its final size.

11. A computer-implemented method for implementing a customizable and animatable popup card system, the method comprising:
in response to receiving a first user input corresponding to an interaction with a rest user interface ("UI") element that is displayed within a software application ("app") window:
generating a first popup UI element, the first popup UI element being different from the rest UI element
mapping sub-elements of the rest UI element to corresponding sub-elements of the first popup UI element;
displaying, within an app window, the first popup UI element, wherein displaying the first popup UI element comprises at least one of:
based on a determination that coordinates of the rest UI element as displayed within the app window indicate that a portion of the rest UI element has moved above a top edge of the app window during a scroll-down operation or a page-down operation, and based on a determination that a percentage portion of the rest UI element that remains within the app window exceeds a threshold percentage portion, displaying, within the app window, the first popup UI element overlaid above at least a portion of the rest UI element in a position such that a top edge of the first popup UI element is displayed below the top edge of the app window; or
based on a determination that coordinates of the rest UI element as displayed within the app window indicate that a portion of the rest UI element has moved below a bottom edge of the app window during a scroll-up operation or a page-up operation, and based on a determination that the percentage portion of the rest UI element that remains within the app window exceeds the threshold percentage portion, displaying, within the app window, the first popup UI element overlaid above at least a portion of the rest UI element in a position such that a bottom edge of the first popup UI element is displayed above the bottom edge of the app window; and causing animation of at least one sub-element of the first popup UI element to transition from an initial state to a final state, during display of the first popup UI element, wherein, in the initial state, the at least one sub-element of the first popup UI element is similar or identical to a corresponding sub-element of the rest UI element.

12. The computer-implemented method of claim 11, wherein the animation comprises at least one of changing positional offset parameters of the sub-element within the app window, changing a level of opacity of the sub-element, changing one or more colors of the sub-element, selectively enabling or disabling rendering of at least portions of the sub-element, changing a size or scale of the sub-element, changing shadow effects of the sub-element, revealing additional sub-elements, hiding the sub-element, playing a video clip within the sub-element, or replacing the sub-element with a media playback UI sub-element.

13. The computer-implemented method of claim 11, wherein displaying the first popup UI element comprises at least one of:

based on a determination that coordinates of the rest UI element as displayed within the app window indicate that the rest UI element lies beyond a first threshold distance from an edge of the app window, displaying, within the app window, the first popup UI element overlaid above at least a portion of the rest UI element in a position that is centered above a horizontal center of the rest UI element between a left edge and a right edge of the rest UI element;

based on a determination that coordinates of the rest UI element as displayed within the app window indicate that the rest UI element lies within the first threshold distance from a left edge of the app window, displaying, within the app window, the first popup UI element overlaid above at least a portion of the rest UI element in a position that is offset from the horizontal center of the rest UI element such that a left edge of the first popup UI element is displayed to the right of the left edge of the app window; or based on a determination that coordinates of the rest UI element as displayed within the app window indicate that the rest UI element lies within the first threshold distance from a right edge of the app window, displaying, within the app window, the first popup UI element overlaid above at least a portion of the rest UI element in a position that is offset from the horizontal center of the rest UI element such that a right edge of the first popup UI element is displayed to the left of the right edge of the app window.

14. The computer-implemented method of claim 13, wherein the percentage portion and the corresponding threshold percentage portion comprise one of:

a percentage of an area of the rest UI element that remains within the app window and a corresponding threshold percentage area; or a percentage of a height of the rest UI element that remains within the app window and a corresponding threshold percentage height.

15. The computer-implemented method of claim 13, further comprising at least one of:

based on a determination that the first popup UI element is not currently being displayed and based on a determination that the percentage portion of the rest UI element that remains within the app window is less than the threshold percentage portion, preventing the first popup UI element from being displayed within the app window; or based on a determination that the first popup UI element is currently being displayed and based on a determination that the percentage portion of the rest UI element that remains within the app window has fallen below the threshold percentage portion, causing animation of the first popup UI element to transition between a first state and a second state, wherein the first state and the corresponding second state comprise one of:

a full height and a zero height;
a full width and a zero width;
a full area and a zero area;
a full opaque display and a full transparent display; or
a fully visible display and a fully hidden display.

16. The computer-implemented method of claim 11, further comprising:

in response to receiving a second user input corresponding to an interaction with the first popup UI element:

generating a second popup UI element, the second popup UI element being different from the rest UI element and the first popup UI element;

mapping at least one of sub-elements of the rest UI element or sub-elements of the first popup UI element to corresponding sub-elements of the second popup UI element;

displaying, within the app window, the second popup UI element, the second popup UI element replacing the first popup UI element; and causing animation of at least one sub-element of the second popup UI element during display of the second popup UI element.

17. A system, comprising:
a processing system; and
memory coupled to the processing system, the memory comprising computer executable instructions that, when executed by the processing system, causes the system to perform operations comprising:

when a cursor is above a portion of a rest user interface ("UI") element or when the rest UI element is being highlighted or selected and based on a determination to generate and display a popup UI element, automatically performing one or more tasks comprising:

generating a first popup UI element, the first popup UI element being different from the rest UI element;

mapping sub-elements of the rest UI element to corresponding sub-elements of the first popup UI element;

displaying, within a software application ("app") window, the first popup UI element, by:

displaying the first popup UI element between a first state to a second state in a smooth transition by progressively changing a size of the first popup UI element between its initial size in the first state and its final size in the second state, wherein the initial size of the first popup UI in the first state is the same size as the rest UI element, wherein the final size of the first popup UI in the second state is different from the size of the rest UI element;

wherein displaying the first popup UI element comprises at least one of:

based on a determination that coordinates of the rest UI element as displayed within the app window indicate that a portion of the rest UI element has moved above a top edge of the app window during a scroll-down operation or a page-down operation, and based on a determination that a percentage portion of the rest UI element that remains within the app window exceeds a threshold percentage portion, displaying, within the app window, the first popup UI element overlaid above at least a portion of the rest UI element in a position such that a top edge of the first popup UI element is displayed below the top edge of the app window; or based on a determination that coordinates of the rest UI element as displayed within the app window indicate that a portion of the rest UI element has moved below a bottom edge of the app window during a scroll-up operation or a page-up operation, and based on a determination that the percentage portion of the rest UI element that remains within the app window exceeds the threshold percentage portion, displaying, within the app window, the first popup UI element overlaid above at least a portion of the rest UI element in a position such that a bottom edge of the first popup UI element is displayed above the bottom edge of the app window; and causing animation of at least one sub-element of the first popup UI element during display of the first popup UI element.

18. The system of claim 17, wherein causing animation of the at least one sub-element of the first popup UI element during display of the first popup UI element comprises displaying intermediate animations of the at least one sub-element as the first popup UI element is being smoothly transitioned between the first state and the second state.

19. The system of claim 17, wherein the percentage portion and the corresponding threshold percentage portion comprise one of:

a percentage of an area of the rest UI element that remains within the app window and a corresponding threshold percentage area; or a percentage of a height of the rest UI element that remains within the app window and a corresponding threshold percentage height.

20. The system of claim 17, wherein the operations further comprise:

based on a determination that the first popup UI element is not currently being displayed and based on a determination that the percentage portion of the rest UI element that remains within the app window is less than the threshold percentage portion, preventing the first popup UI element from being displayed within the app window; or based on a determination that the first popup UI element is currently being displayed and based on a determination that the percentage portion of the rest UI element that remains within the app window has fallen below the threshold percentage portion, causing animation of the first popup UI element to transition between a first state and a second state, wherein the first state and the corresponding second state comprise one of:

a full height and a zero height;
  a full width and a zero width;
  a full area and a zero area;
  a full opaque display and a full transparent display; or
  a fully visible display and a fully hidden display.

* * * * *